(12) United States Patent
Fisher et al.

(10) Patent No.: US 9,906,957 B1
(45) Date of Patent: *Feb. 27, 2018

(54) AUTHENTICATION AND SECURITY FEATURES FOR A MOBILE APPLICATION

(71) Applicant: United Services Automobile Association (USAA), San Antonio, TX (US)

(72) Inventors: Jeremy Fisher, San Antonio, TX (US); Joshua Goforth, San Antonio, TX (US); James Chrisopher Watson, San Antonio, TX (US); Richard Davey, San Antonio, TX (US)

(73) Assignee: United Services Automobile Association (USSA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/429,469

(22) Filed: Feb. 10, 2017

Related U.S. Application Data

(63) Continuation of application No. 13/795,558, filed on Mar. 12, 2013, now Pat. No. 9,591,481.
(Continued)

(51) Int. Cl.
| | |
|---|---|
| *H04M 1/66* | (2006.01) |
| *H04W 12/06* | (2009.01) |
| *H04W 4/02* | (2018.01) |
| *H04W 12/08* | (2009.01) |
| *H04L 29/08* | (2006.01) |

(52) U.S. Cl.
CPC .......... *H04W 12/06* (2013.01); *H04L 67/306* (2013.01); *H04W 4/023* (2013.01); *H04W 12/08* (2013.01)

(58) Field of Classification Search
CPC ... H04W 76/02; H04W 40/02; H04W 40/248; H04W 4/12; H04W 80/10; H04W 60/00; H04W 48/16; H04W 4/04; H04L 51/04; H04L 12/581; H04L 67/306;
(Continued)

(56) References Cited

U.S. PATENT DOCUMENTS 6,256,633 B1 7/2001 Dharap
7,171,384 B1 1/2007 Fitzpatrick et al.
(Continued)

OTHER PUBLICATIONS

ThinkDesktop User Manual last updated: Dec. 17, 2009, www.thinkorswim.com/learningcenter, 54 pages.

*Primary Examiner* — Fred Casca
(74) *Attorney, Agent, or Firm* — Fish & Richardson P.C.

(57) ABSTRACT

Embodiments of the present invention provide methods, systems, and computer-readable storage medium for managing access to an application on a mobile computing device. In an embodiment, a method includes receiving a request from a user to return to the application and return to a previous screen of the application on the mobile computing device, and determining, using a processor, whether the previous screen of the application was in a secured area of the application. If it was in the secured area, then an authentication protocol is triggered prior to allowing the user to return to the previous screen in the secured area of the application on the mobile computing device. In another embodiment, geolocation dependent information is provided to a user via an application on a mobile computing device.

10 Claims, 16 Drawing Sheets

Related U.S. Application Data

(60) Provisional application No. 61/611,474, filed on Mar. 15, 2012.

(58) Field of Classification Search
 CPC . H04L 63/0869; H04L 65/1086; H04L 63/08; H04L 67/14; H04L 67/143
 USPC .............................. 455/466, 410, 411, 412.1
 See application file for complete search history.

(56) References Cited

U.S. PATENT DOCUMENTS

| | | |
|---|---|---|
| 7,774,230 B2 | 8/2010 | Libman |
| 7,813,983 B2 | 10/2010 | Wottowa et al. |
| 8,015,606 B1 | 9/2011 | Jevans et al. |
| 8,032,453 B2 | 10/2011 | Ahuja et al. |
| 8,271,379 B1 | 9/2012 | Watson |
| 8,386,561 B2 | 2/2013 | Artz, Jr. et al. |
| 8,548,909 B1 | 10/2013 | Snow et al. |
| 8,566,187 B2 | 10/2013 | Keld et al. |
| 8,566,203 B1 | 10/2013 | Vieira et al. |
| 8,566,718 B1 | 10/2013 | O Neill |
| 8,856,958 B1 | 10/2014 | Kosslyn et al. |
| 2002/0091937 A1* | 7/2002 | Ortiz ................... H04L 63/0861 726/5 |
| 2003/0050976 A1 | 3/2003 | Block et al. |
| 2005/0257156 A1 | 11/2005 | Jeske et al. |
| 2006/0015387 A1 | 1/2006 | Moore et al. |
| 2007/0027895 A1 | 2/2007 | Bridges et al. |
| 2007/0167151 A1 | 7/2007 | Zinn et al. |
| 2007/0245407 A1* | 10/2007 | Lester .................... H04L 63/08 726/5 |
| 2008/0086508 A1 | 4/2008 | Ballew |
| 2008/0186871 A1 | 8/2008 | Trevino et al. |
| 2008/0234051 A1 | 9/2008 | McNutt et al. |
| 2009/0193514 A1 | 7/2009 | Adams et al. |
| 2009/0281959 A1 | 11/2009 | Abidi et al. |
| 2010/0004957 A1 | 1/2010 | Ball |
| 2011/0028138 A1 | 2/2011 | Davies-Moore et al. |
| 2011/0093790 A1 | 4/2011 | Maczuba |
| 2011/0107265 A1 | 5/2011 | Buchanan et al. |
| 2012/0110087 A1 | 5/2012 | Culver et al. |
| 2012/0124651 A1 | 5/2012 | Ganesan et al. |
| 2012/0240060 A1 | 9/2012 | Pennington et al. |
| 2012/0246044 A1 | 9/2012 | Fox et al. |
| 2012/0259647 A1 | 10/2012 | Syed et al. |
| 2012/0295580 A1* | 11/2012 | Corner ................. H04W 12/12 455/405 |
| 2012/0310764 A1 | 12/2012 | Sinsheimer et al. |
| 2014/0274107 A1 | 9/2014 | Rados |

* cited by examiner

AUTHENTICATION AND SECURITY FEATURES FOR A MOBILE APPLICATION

CROSS-REFERENCES TO RELATED APPLICATIONS

This application is a continuation application of and claims priority to U.S. application Ser. No. 13/795,558, filed on Mar. 12, 2013, which claims priority to U.S. Provisional Patent Application No. 61/611,474, filed Mar. 15, 2012, entitled "Authentication and Security Features for a Mobile Application," the disclosure of which is hereby incorporated by reference in its entirety for all purposes. This application is related by subject matter to the following applications: U.S. patent application Ser. No. 13/795,576, filed on Mar. 12, 2013 and U.S. patent application Ser. No. 13/795,621, filed on Mar. 12, 2013. The entire contents of the aforementioned applications are hereby incorporated by reference in their entirety.

BACKGROUND OF THE INVENTION

Customers demand more of the products and services they use than ever before. They insist that the companies they deal with on a regular basis provide them greater and greater levels of accuracy and more tailored service offerings. Companies configure and operate ever increasing numbers of computer systems to achieve this. Using sources of information that have traditionally been unavailable when servicing these customers are now expected.

SUMMARY OF THE INVENTION

The present invention generally relates to managing access to an application on a mobile computing device. More specifically, the present invention relates to methods and systems for implementing user authentication and security features for an application for a mobile computing device. When a user operating a mobile computing device switches to another task and attempts to return an application previously accessed and resume tasks on a previous screen, a user authentication and security protocol in accordance with embodiments of the present invention is used to protect the user's sensitive information. The methods and techniques can be applied to applications to access any financial, insurance, or other business systems that handle sensitive or private user data that need to be protected.

The present invention also relates to providing customized information for a user through an application using a geolocator of a mobile computing device. The geolocator of the mobile computing device can be used to anticipate the user's needs and to enhance the user's experience with an institution providing the application on the user's mobile computing device.

According to an embodiment of the present invention, a method performed by a processor of a mobile computing device provides managing access to an application. The method includes providing a processor and a memory, operatively coupled to the processor. The method also includes receiving a request from a user to return to the application and resume tasks at a previous screen of the application on the mobile computing device, and determining, using the processor, whether the previous screen of the application was in a secured area of the application. If the previous screen of the application was in the secured area, then an authentication protocol is triggered prior to allowing the user to return and resume tasks at the previous screen of the application.

According to another embodiment of the present invention, a method of providing geolocation dependent information is provided using an application on a mobile computing device. The method includes providing a processor and a memory storing the application, operatively coupled to the processor. The method also includes receiving, from a user, a request for information related to an institution providing the application. The method determines, using the processor, whether the requested information is customizable to a local zone at which the user is located. If it is customizable, then geolocation of the mobile computing device is determined, and the requested information is provided to the user. In an embodiment, the information is customized to the local time zone which matches the geolocation of the mobile computing device.

According to another embodiment of the present invention, a system provides a processor and a computer storage medium including a plurality of computer-readable instructions tangibly embodied on the computer-readable storage medium. The plurality of computer-readable instructions, which, when executed by a data processor, provide method steps described in the present application.

According to another embodiment of the present invention, a computer-readable storage medium provides a plurality of computer-readable instructions tangibly embodied on the computer-readable storage medium. The plurality of computer-readable instructions, which, when executed by a data processor, provide method steps described in the present application.

Numerous benefits are achieved by way of the present invention over conventional techniques. For example, embodiments of the present invention provide an authentication model that balances convenience with security for re-accessing an application on a mobile computing device. An authentication protocol in accordance with the present invention adds another layer of security for protecting a user's sensitive data. Additionally, the authentication protocol is based on an adaptive architecture where the authentication protocol can be modified using a user profile based on the user's business relationship with a financial institution. Furthermore, any suitable information can be tailored to the user's geolocation using a geolocator in the mobile computing device. These and other embodiments of the invention along with many of its advantages and features are described in more detail in conjunction with the text below and attached figures.

DETAILED DESCRIPTION OF SPECIFIC EMBODIMENTS

Figure 1A:
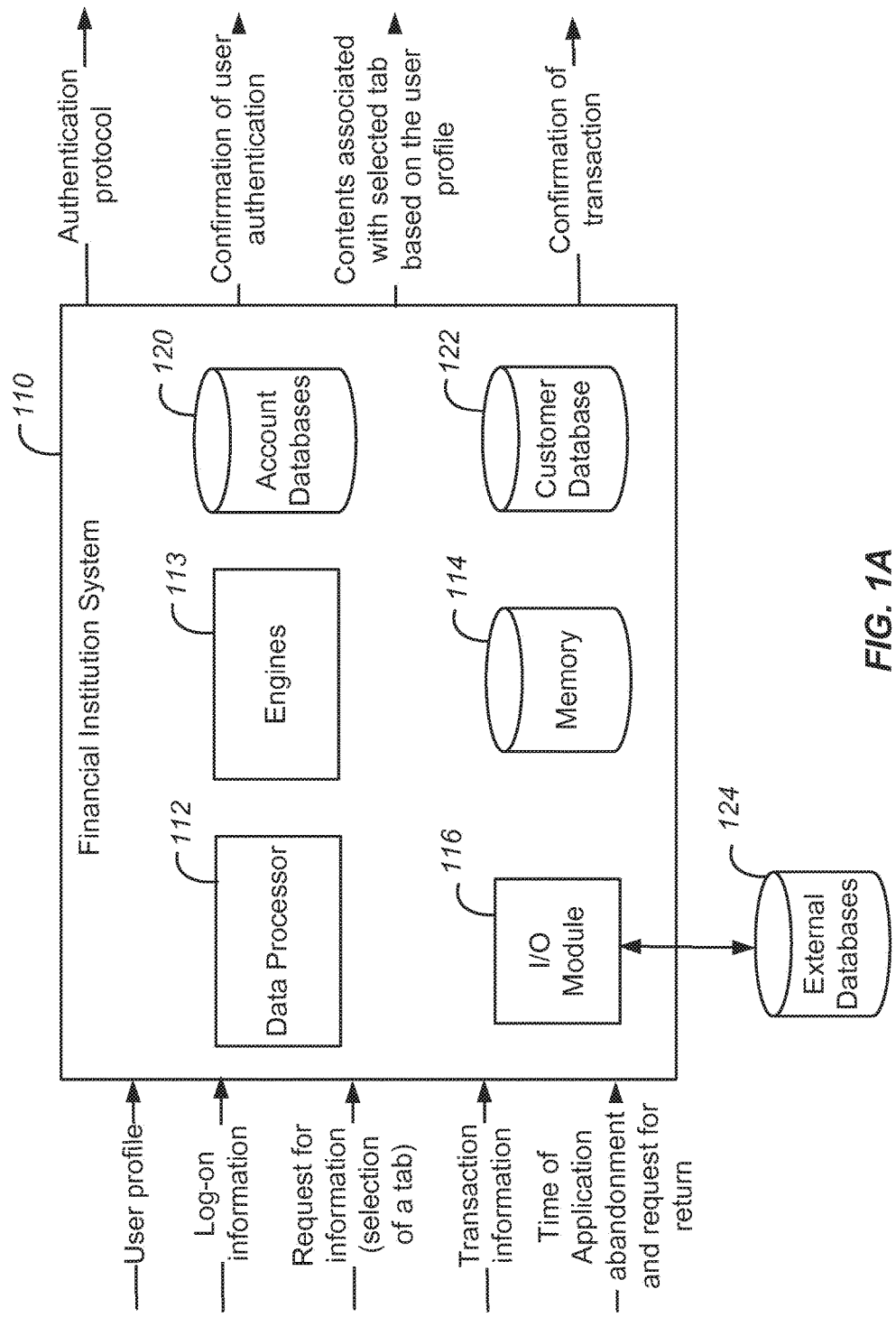
FIG. 1A is a high level schematic diagram illustrating a financial institution system according to an embodiment of the present invention.

Embodiments of the present invention relate to technologies that allow a customer to conveniently obtain quick and secure re-access to information via an application on a mobile computing device. When an application on the mobile computing device has access to sensitive data in a shared environment, the application in accordance with the present invention can be provided with a user authentication protocol that balances convenience and user security.

Applications running on mobile computing devices are vulnerable to security breaches, because these devices are often shared among a number of users. They are routinely accessed by non-owners. For example, an iPad™ tablet is often shared by family members of a household or friends of the owner of the tablet. When the owner of an iPad™ tablet leaves the device unattended with an application open with the user's sensitive data, the device may be accessed by non-owners, exposing the user's sensitive data to others.

Multitasking capabilities of mobile computing devices aggravate the security risk of running applications with sensitive data. Multitasking allows applications to continue to run in the background even after a user switches to another application. Since the applications in the background are not visible on the screen, the user of a mobile computing device may not be aware that these applications are running or left open in the background. As an example, when a user presses a home button on an iPad™ tablet to switch to another task (e.g., checking e-mails or switching to another application), the user may mistakenly perceive that the application has closed. However, the application is not closed and logged off, but is either running or suspended in the background of the screen. Therefore, the multitasking capabilities of mobile computing devices may increase security risks as the owners of such devices may mistakenly believe that the applications with sensitive data have been closed.

Embodiments of the present invention provide a user authentication protocol for returning to an application. It offers maximum convenience, as it allows the user to quickly re-access information and services, and yet protects user's private and sensitive data. In embodiments of the present invention, the efficiency and need to multitask is balanced against the need to protect user data, particularly for shared mobile computing devices. If an application quits every time the user switches in and out of the application to protect the user's sensitive data, it would be inconvenient for the user. In this case, the user would lose all of the open data and would need to provide full login information to re-launch the application. In embodiments of the present invention, a new layer of security features is provided in addition to the existing security protocols that are in place for a mobile computing device.

In embodiments of the present invention, authentication and security features are not initiated by the user. Rather, they are triggered by the user's action, behavior, or activity when the user attempts to re-access the application and to resume viewing a previous screen in a secured area of the application. In the present invention, the user is not timed out to a full log off state when the user switches away from the application. Instead, a new middle tier in the log-on state is introduced, where the user may be challenged to provide at least one credential to re-access the application to return to the private session that had been previously established. Contrary to embodiments of the present invention, currently available applications on a mobile computing device do not provide a middle tier in the tog-on state. Instead, a user is either logged in or logged out of these applications.

A new middle tier authentication protocol in accordance with embodiments of the present invention can be implemented to allow the user to re-access certain areas of the application where the user left off. The middle tier authentication protocol is an authentication procedure which is introduced in the middle of a live session when the user quits or abandons the application and tries to return to the previous screen of the application. In an embodiment, the middle tier authentication protocol has less rigorous authentication requirements than the use of multifactor user identification elements (e.g., a user ID and a password) typically required when initially logging into secured areas of the application. For example, a single identification element, such as a PIN number, may be required for the middle tier authentication protocol. If the user was in a secured area of the application (e.g., completing a loan application or setting up a new bill), fully logging off the user would delete all the work performed by the user. Therefore, providing a middle tier authentication protocol protects the user's data and make it convenient for the user to re-access a previous screen in the application.

In embodiments of the present invention, triggering a middle tier authentication protocol depends on the user's action in terms of time. As an example, if a user switches away from an application on a mobile computing device and returns to the application within a predetermined time period (e.g., 30 seconds), then no user authentication will be required to return to a previous screen in the application that the user was viewing. However, if the user switches away from the application longer than the predetermined time period, then the application may impose a low barrier firewall for reentry into the application. For example, a PIN number may be required to re-access to a secure, private session that had been previously established. If the user quits or switches away from the application and returns after a prolonged time period (e.g., 20 minutes), the original context of the application may be discarded, and the application will return to the initial launch screen of the application.

In one embodiment, a tiered authentication protocol is provided, where tiers and requirements of user authentication protocol may change as a function of time. An application in accordance with the present invention may include timestamps, which mark a time point when the application went into hibernation (or a last user input in the application). The timestamps also mark a time point when the application wakes up (e.g., by a user touching a home button and the application icon). When the marked time points indicate that the user was away from the application longer than a first predetermined time period (e.g., 30 seconds) but less than a second predetermined time period (e.g., 20 minutes), the user may be subject to a low level authentication requirement (e.g., a single identification element). After a longer time period (e.g., after 20 minutes but within one hour), the user may be subject to a higher level authentication requirement (e.g., multifactor identification elements).

In another embodiment of the present invention, other user actions may be used to determine whether the person trying to re-access the application is the same user who was previously authenticated moments ago. For instance, a motion sensor or geolocation sensor in a mobile computing device may be used to guesstimate the user's identity. If the motion or geolocation sensor determines that the device has changed its location (e.g., by setting the device on a coffee table and then being picked up; or by being moved from room to room), then there is a higher likelihood that the person picking up the device to a new location may be a different user. In an implementation, a position sensor may record the position or orientation of the mobile computing device when the application wakes up or when the home button is pushed. The orientation or geolocation of the device may be compared to the orientation or geolocation of the device at an earlier time point (e.g., when a home button was pushed to switch away from the application). In this embodiment, an authentication protocol may be triggered based on a change in the device's position, location, or orientation.

In another embodiment of the present invention, the middle tier authentication protocol (e.g., re-validation of authentication) may be required only when the user leaves an application in the middle of performing a task in secured areas of the application. The secured areas of the application may include, for example, banking, insurance, investments, funds transfer, or bill payment screens, which include financial data of the user. If the user has bank accounts and switched away from the application while viewing the user's bank account information, then the authentication protocol is triggered so that the user re-validates authentication prior to re-accessing the application. On the other hand, if the user does not have investment accounts with the financial institution and if the user left the application in the middle of browsing investment marketing information, then re-authentication is not required. Similarly, certain areas of the application, such as "contact us" or customer support screens, do not contain any sensitive data and are not typically behind a firewall. Thus, reentry into the unsecured areas of an application does not require re-authentication.

In another embodiment of the present invention, an adaptive architecture is used to build an application so that the application can adaptively provide customized information and security features for each user depending on the user profile based on the user's business relationship with an organization. The adaptive architecture allows the system to understand who the current user is and to deliver the correct experience for the user. For example, a service oriented experience is provided for current customers, whereas market information is provided for prospects whose identities are unknown to the financial institution system.

In an embodiment, triggering an authentication protocol depends on a user profile in relation to each primary service section of the application (e.g., banking, insurance, investment, bill paying, deposit/transfer, or the like). As an example, if a user is a member of banking and insurance services, re-accessing banking and insurance screens of the application may require re-authentication since financial data of the user related to these services is behind the firewall. On the other hand, if the user is a member of the banking service, but not the insurance service, then the insurance screen of the application for the user may be in an unsecured area of the application since the user does not have any sensitive financial data related to insurance. Thus, in this case, the user can switch back and re-access the insurance screen of the application to view insurance marketing material without re-authentication.

The re-authentication requirements may also depend on other types of membership status within a financial institution providing the application. Members of the financial institution may be segregated according to their relationship with the institution (e.g., a length of membership, the total account value, or the like). Depending on the relationship, certain features of the application may require re-authentication. For example, a member who has a premiere status with a service provider (e.g., through a long-term membership) may be provided with special phone numbers to contact the service provider, which may not be available to other members. In another example, a user with a qualified military or deployment status may be provided with a special contact number (e.g., a different phone number with a 24-hour service or a shorter wait time for reaching a representative), which is not available to other members. Returning to a screen displaying these special numbers may require re-authentication for certain segments of members.

In some embodiments, different secured areas may have varying levels of authentication requirements. A secure area that has the user's financial and sensitive information a banking screen) of an application may have more stringent authentication requirements than a contact screen (which may provide special phone numbers for premiere members).

In another aspect of the present invention, embodiments of the present invention provide an application configured to provide customized information for a user using a geolocator of a mobile computing device. The geolocator of the computing device can be used to anticipate the user's needs and to enhance the user's experience with a service provider by providing information and customer support options specifically tailored to the user's geolocation. As an example, if the user selects an icon for contacting a service provider on a mobile computing device screen, then the geolocation of the user may be determined. Then, the contact information customized to the user's location and local time can be displayed on the device screen. If it is determined that a user is located in a foreign country (e.g., United Kingdom or Afghanistan), the device screen will display special contact phone numbers with appropriate international requirements so that the user can dial from any place in the world automatically. Thus, a user does not need to navigate through a list of phone numbers to contact a service provider.

As described more fully throughout the present specification, embodiments of the present invention provide technologies to provide a customer with convenience of obtaining quick and secure re-access to information via an application on a mobile computing device. Additional description related to these embodiments is provided throughout the present specification and more particularly below.

FIG. 1A is a high level block diagram illustrating a financial institution system 110. The financial institution system 110 utilizes inputs received from the user and processes the received inputs to provide various outputs including re-authentication of the user and requested information. In embodiments of the present invention, the financial institution system may be operated by a financial services company, which may offer a number of different services, including banking, insurance, investment, credit card, or the like. While FIG. 1 illustrates a financial institution system as an example, the system 110 can be utilized by any type of entity or business that wishes to provide an application that balances convenience and security for its users.

As illustrated in FIG. 1A, multiple inputs are received by the financial institution system 110. The inputs may include information related to the user profile (e.g., prospect, customer, wants to become a customer), log-on information, or the like. The inputs may also include a request for contents or a transaction via a selection of a tab (also referred to as a navigation control item) from a plurality of tabs on a page of an application. In an embodiment of the present invention, user interface elements, such as tabs or navigation control items are used to navigate different primary service sections or main features of services provided by the financial institution. For example, the user may seek access to the user's bank account information by selecting a banking tab on a page of the application. The financial institution system can also receive information related to transactions related to the user's accounts (e.g., paying bills, deposit, or transfer of funds). The inputs may further include the time of application abandonment by the user and the time of user's request to return to the application. Although five inputs are illustrated in FIG. 1A, embodiments of the present invention are not limited to these particular inputs, and other inputs are within the scope of the present invention.

Once information and/or requests from the user are received by the financial institution system, a data processor 112 and engines 113 (e.g., authentication engine, user interface engine, financial engine, or the like) interact with a number of different databases (e.g., account databases 120 and customer database 122) to perform various analyses. In an embodiment, using information related to the time of application abandonment (e.g., pushing a home button) and the time of the user's request to return to the application, an authentication protocol can be determined. For example, if the user's request to return and re-access the previous screen is received after a predetermined time period after the application abandonment, the authentication protocol may require a PIN code or other credential data. While the financial institution system 110 can also include other databases, engines, systems, subsystems, or the like, these other components are not illustrated in FIG. 1A.

As illustrated in FIG. 1A, multiple outputs can be provided for the user. For example, an authentication protocol (e.g., re-authentication during a session) may be provided as an output. The confirmation of user authentication can also be provided as an output. The outputs may further include contents associated with a selected tab, which are dependent on a user profile. Furthermore, other requested transactions (e.g., paying bills, transferring money between accounts, or the like) or confirmation of transactions can be provided as an output. Although four outputs are illustrated, embodiments of the present invention are not limited to these particular outputs, and other outputs are within the scope of the present invention.

Figure 1B:
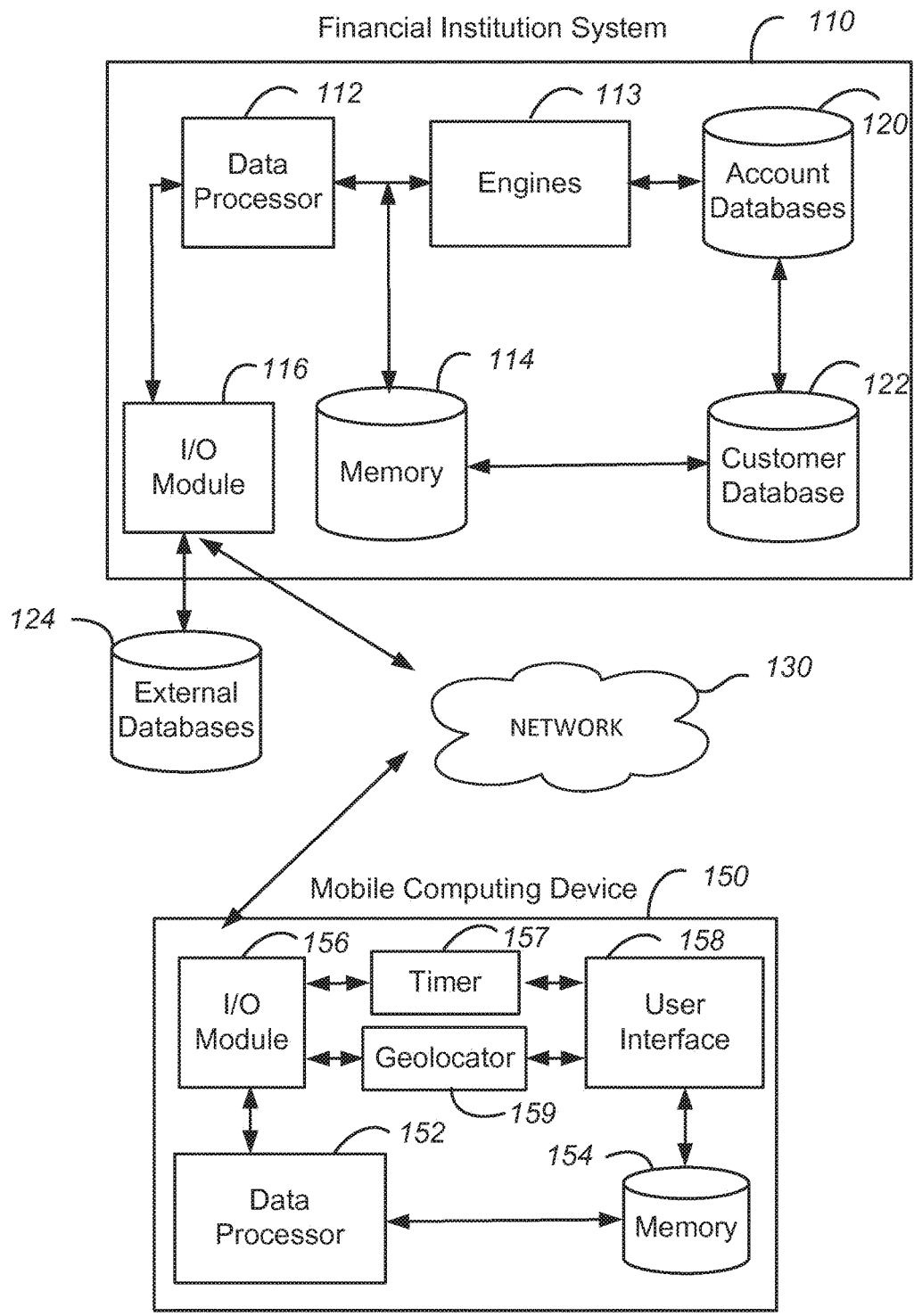
FIG. 1B is a high level schematic diagram illustrating an interaction of a financial institution system with a user according to an embodiment of the present invention.

FIG. 1B is a high level schematic diagram illustrating an interaction of a financial institution system with a user according to an embodiment of the present invention. As illustrated in FIG. 1B, a user operating a mobile computing device 150 interacts with the financial institution system 110 through network 130. The mobile computing device 150 can include one of many types of mobile computing devices including, without limitation, a laptop computer, a notebook computer, a tablet computer (e.g., iPad™), a handheld mobile device, a PDA, a mobile phone, or the like. The user may seek access to the financial institution system 110 to obtain information, such as account information of the user maintained by the financial institution system, products, or services through the mobile computing device 150.

Figure 6:
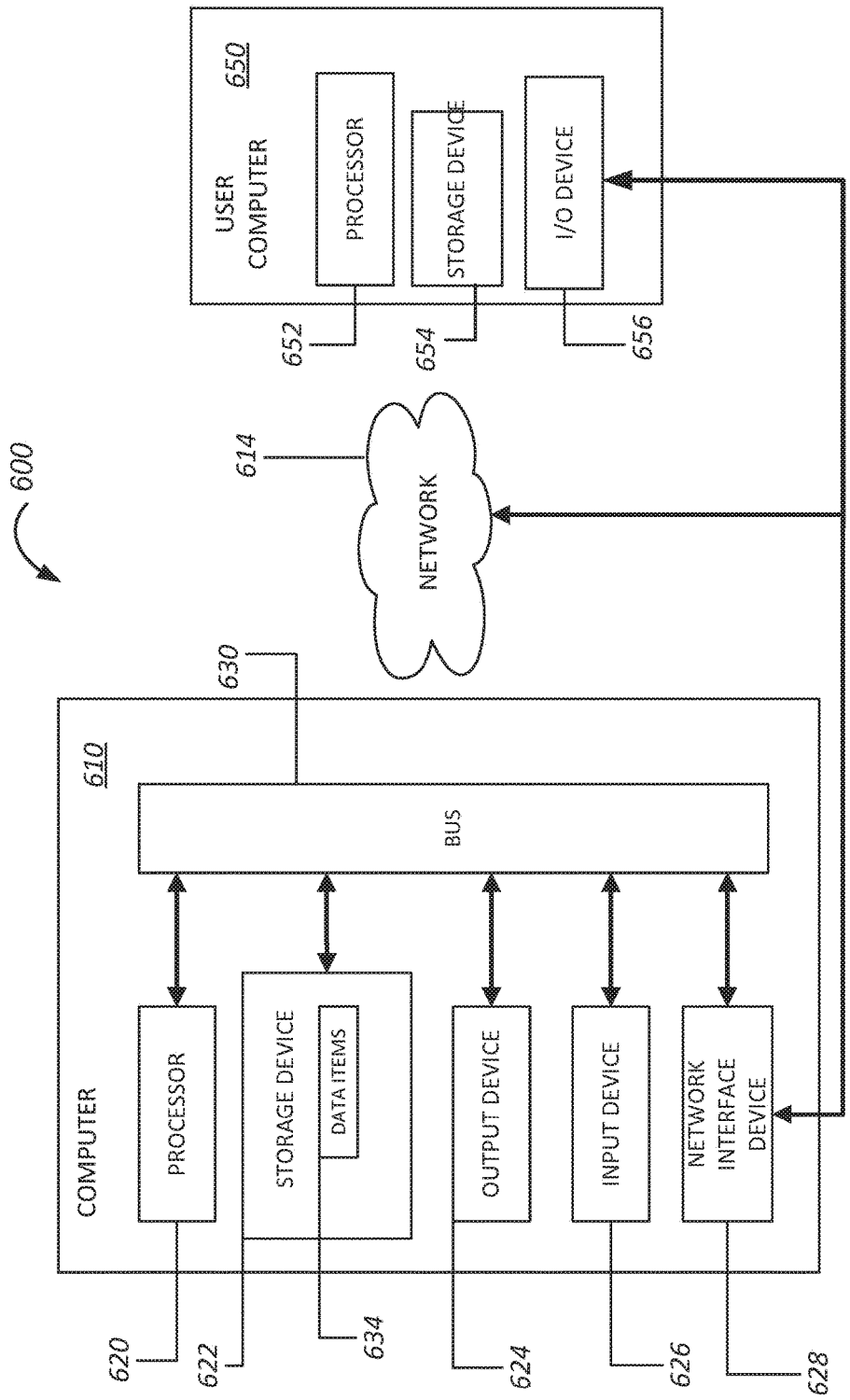
FIG. 6 is a high level schematic diagram illustrating a computer system including instructions to perform any one or more of the methodologies described herein.

As shown in FIG. 1B, the financial institution system 110 includes a data processor 112, also referred to as a processor, and a memory 114. The description provided in relation to processors and memory in FIG. 6 is also applicable to the data processor 112 and memory 114. An input/output module 116 (also referred to as a communications module) is provided to enable communications between the financial institution system and external users, computers, and mobile computing devices.

The financial institution system 110 also includes account databases 120, external databases 124, and a customer database 122. The financial institution system 110 is communicatively coupled, in one example, to an external database 124, which may include information related to external accounts outside of the financial institution system 110 or other financial services information. The account databases 120, in contrast with the external databases 124, are maintained by the company operating the financial institution system 110, typically by a financial servicers company such as the present assignee. As described more fully throughout the present specification, the I/O module 116, the data processor 112, memory 114, account databases 120, and customer database 122 are utilized to receive inputs from the user mobile computing device 150 via an application. These components can also be utilized to transmit requested information, such as account information, to the user.

Customer database 122 stores data on customers/members of an organization, which may include both existing customers and/or potential customers of a financial services company. The use of the term "member" is not intended to limit the scope of the present invention but merely to provide an example of a customer who may be benefited by embodiments of the present invention. In this sense, the use of the term member is intended to cover the term customer.

In embodiments of the present invention, the members or customers of the financial institution may be segregated according to types of accounts they have with the financial institution, account values, a length of the relationship, or the like. For example, users can be segmented and profiled into three different types based on their business relationship with respect to different primary service sections of the financial institution (e.g., banking, insurance, investments, paying bills, transfer/deposit, or the like): a customer-owner, a customer-prospect, and a prospect (e.g., identity is unknown to the financial institution). Alternatively, users may be referred to as "a prospect," "a member-prospect," or "a member-owner." In embodiments of the present invention, any discussions related to a member in this application also apply to a customer, and vice versa.

The data on the customer (e.g., member) stored in customer database 122 may include a customer's name, address, date of birth, Social Security number, credit history, and other demographic information, information regarding financial accounts held by the customer, information regarding the customer's purchase history, or the like. In some embodiments, the customers' identification elements, such as a user name, passwords, PINs, secret phrases, biometrics, or other credentials may be also stored in customer database 122 or in another database not shown in FIG. 1B.

The financial institution system 110 also includes engines 113. The engines 113 may be a single engine or a collection of engines performing different functions. For example, the engines 113 may include a financial services engine, an authentication engine, and a user interface engine. The financial services engine and data processor 112 interact with account bases 120 to process financial data of the user. The financial services engine may, for example, transfer money between accounts of the user or pay bills according to instructions received from the user.

The authentication engine in the financial institution system or a server computer can analyze and process personal identification elements received from the user and the user devices. The personal identification elements received from the user can be compared with credentials previously stored in a database, such as user names, passwords, secret phrases, personal identification numbers (PINS), biometrics, or other credentials. The authentication engine may use the personal identification elements to authenticate the user to permit access to contents associated from the financial institution system via network 130 through the mobile computing device.

The user interface engine of the financial institution system may generate and format one or more pages of content (e.g., display views) as a unified graphical presentation that may be provided, as an output from the financial institution system 110. The pages of content may be provided to the mobile computing device 150 via an application or a website associated with the financial institution system. The pages of content may be provided to mobile computing devices as well as other user devices, such as a desktop computer, depending on the implementation. In some embodiments, pages of content may generated and stored locally in the client device when the application is executed in the client device.

Upon authenticating the user identity and/or user profile, the user interface engine may generate and format pages of content according to the user identity and user profile. For example, if the financial institution system receives a request for banking information (via the user selection of a banking tab on a mobile application), pages of content for the customer-owner generated by the user interface engine may include information related to the customer-owner's bank accounts. By contrast, if the request is received from prospects, whose identities are unknown to the financial institution, pages of content generated by the user interface engine may include marketing information related to banking services. One or more pages of contents generated by the user interface engine can then be transmitted to the user mobile computing device.

A user operating the mobile computing device 150 interacts with the financial institution system 110 through network 130, which may be the Internet. In some embodiments, the network 130 is partly or wholly a private wide area network, local area network, or the like. In an embodiment described in additional detail below, a user can request to transfer money between accounts using user interface 158, which results in data transfer through I/O module 156 and network 130. The information from the user, for example, an amount of transfer to another account, can be used by the financial institution system 110 to determine if the transfer should be approved. The mobile computing device 150 can receive responses such as requests to update information from the financial institution system 110, process the received information using data processor 152, store the received and/or processed information using memory 154, and display the processed/stored information using the user interface 158.

As an example, a customer of a financial services company can use the mobile computing device 150 to interact with the financial services company (e.g., the present assignee) through the Internet, providing and receiving information through web pages or a mobile application operated by the financial services company (e.g., the present assignee's website). A website hosted by the financial institution system or other systems in a server can run a software or application, which manages, for instance, user re-authentication and re-access to the application. In another embodiment, an application may be downloaded to a mobile computing device and stored in the memory of the mobile computing device.

In the embodiment shown in FIG. 1B, the user mobile computing device 150 also includes a timer 157 and a geolocator 159. The timer 157 is configured to keep track of timing related to the user's activities on a given application launched in the mobile computing device. For example, the tinier keeps track of a time point when an input is received from a user (e.g., by touching a device screen) for a screen in the given application. If the user leaves the device unattended or if a given application does not receive any user input for a predetermined time period, the timer may trigger an authentication protocol prior to allowing the user tore-access the screen in the application previously launched on the mobile computing device.

While it is not illustrated in FIG. 1B, the mobile computing device 150 may further include motion and geolocation sensors which determine whether the mobile computing device has been moved in space. In an embodiment, the motion sensor may include a 3-axis accelerometer or GPS receiver to sense orientation of the mobile computing device. A motion sensor in the mobile computing device may be used to guesstimate whether a person attempting to re-access an application previously launched on the device is the same person who was authenticated moments ago.

In the embodiment shown in FIG. 1B, the mobile computing device 150 includes a geolocator 159. The geolocator 159 may be a GPS receiver, which typically uses satellite data to calculate the user's exact geolocation. When a GPS signal is unavailable, the geolocator 159 may use information from cell towers to triangulate the user's approximate location. In some instances, local Wi-Fi networks are used in combination to geolocate the user's mobile computing device. The geolocator 159 can be used to locate the mobile computing device and the user so that information requested by the user can be tailored and customized to the user's location as described in the present specification.

While FIG. 11B illustrates the mobile computing device 150 interacting with the financial institution system 110, any user computing device, such as a desktop computer, may interact with the financial institution system in the manner described in the present application. Many features described in relation to an application for a mobile computing device are applicable to websites for a mobile computing device or a desktop computer.

Figure 2:
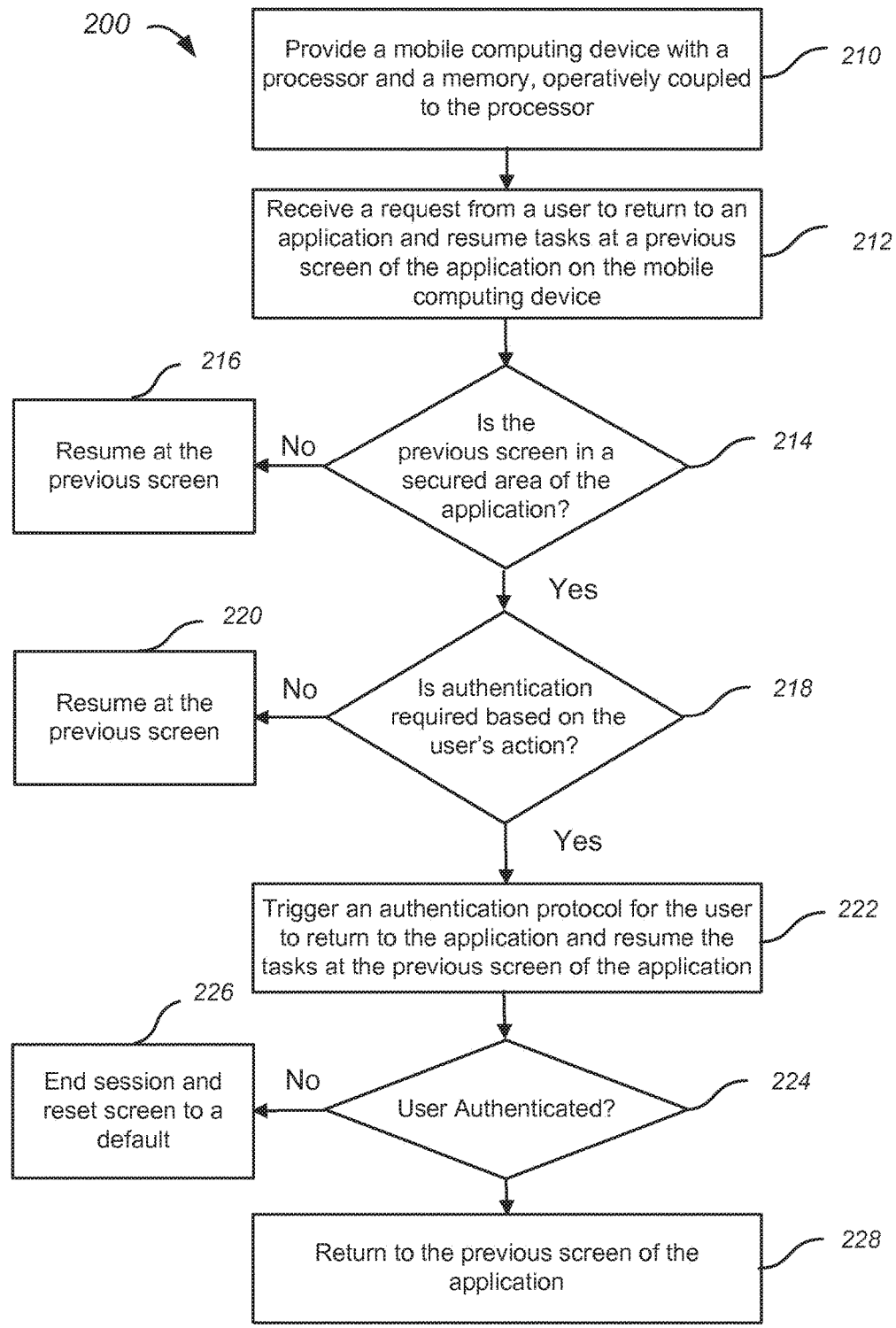
FIG. 2 is a high level flowchart illustrating a method of managing access to an application on a mobile computing device according to an embodiment of the present invention.

FIG. 2 is a high level flowchart illustrating a method performed by a mobile computing device. In an embodiment illustrated in FIG. 2, the method 200 is used to determine whether to trigger an authentication protocol to identify a user of the mobile computing device prior to allowing the user to return to an application and resume tasks at a previous screen in the application. In FIG. 2, the method 200 includes providing a processor and a memory, operatively coupled to the processor (210). The application may be downloaded to the memory of the mobile computing device from a financial institution system or other third party sites. In some embodiments, an application can reside on a server computer and can be accessed via a network, and part of the application may be downloaded to the mobile computing device for local processing each time it is used.

In an embodiment of the present invention, a user operating a mobile computing device may have launched an application. The user may perform a task in a secured area (that includes user's financial or sensitive data) of the application after providing appropriate user authentication credentials (e.g., a user name, a password, and/or a PIN number). Alternatively, the user may be viewing screens in unsecured areas (e.g., marketing or contact information). The user may then abandon the application without closing it (e.g., switching to another application). Referring to FIG. 2, subsequent to the application abandonment, the method includes receiving a request from a user to return to the application and resume tasks at the previous screen of the application (212). For example, after switching to perform another task on the mobile computing device, the user may select a home button and an icon for the application in an attempt to return to the application and resume where the user left off.

The method 200 includes determining, using the processor, whether the previous screen in the application was in a secured area or an unsecured area of the application before the application went into hibernation or switched away to another task (214). In an embodiment, the secured area of the application may include any screens that may lead to financial data of a user. Examples of such screens may include screens related to banking, insurance, insurance, pay bill, transfer, or the like.

In some embodiment, the secured area may be different for different users depending on a user profile based on the user's business relationship with the financial institution. For example, if a first user is a customer of both banking and insurances services, then a selection of either the banking tab or the insurance tab in the application may lead to sensitive financial data of the first user. Thus, both the banking and insurance screens in the application are considered as secured areas of the application for the first user. If a second user is a customer of only banking, then the banking screen of the application is regarded as a secured area of the application for the second user. However, the insurance screen which provides general marketing information, is regarded as an unsecured area of the application for the second user.

If it is determined that the previous screen in the application was not in a secured area (i.e., unsecured area) of the application before the device went idle or being switched away to another task, then the user is allowed to return to the application and resume tasks at the previous screen of the application without requiring any user authentication (216). In an embodiment of the present invention, the screens can be profiled locally on the mobile device (e.g., "secure" or "unsecured"). Therefore, in this embodiment, contacting the server computer is not required to return to an unsecured area of the application.

If it is determined that the previous screen in the application was in a secured area of the application, then the method 200 further determines whether the user authentication is required based on the user's action (218). In one embodiment, the user's action may be the user's activity related to the application as a function of time. For example, an initial time point of the application being put into suspension or sleep (e.g., by pressing home button, pressing lock button, closing cover, or sleep from lack of user interaction) may be time stamped. This initial time point is then compared with a later time point when the user requests to return to the application. For example, the user may request to return to the application by pressing a home button followed by selecting an icon for the application to bring it to the foreground of the device screen. In an implementation, a time delay between the initial time point and the later time point may be measured by a timer 157 (shown in FIG. 1) included in the mobile computing device.

In an embodiment of the present invention, the server (e.g., a financial institution system) may also be informed of the time of application abandonment. In this scenario, when the application is brought back to the foreground, a query to the server would determine whether the middle-tier re-authentication is required. In this case, it would be the local application that assumes that some re-authentication may be required. However, it is the server that ultimately decides whether a re-authentication procedure is necessary.

In one implementation, if the time delay is less than a first predetermined duration (e.g., 30 seconds), then the user may be allowed to return to the application and resume tasks at the previous screen user re-authentication (220). If the time delay is greater than the first predetermined duration but less than a second predetermined duration (e.g., 20 minutes), then a middle tier authentication protocol may be triggered to return to the previous screen of the application (222). If the time delay is greater than the second predetermined duration, then the prior context may be discarded, and the user will be returned to the first launch screen of the application. Any suitable threshold may be selected for the first and second predetermined time durations to balance the user's convenience with security. For example, the first predetermined duration can be set at 30 seconds, 1 minute, or 2 minutes, and the second predetermine duration can be set at 20 minutes, 30 minutes, or 1 hour.

In an embodiment of the present invention, the middle-tier re-authentication requires an easier, low barrier re-entry, such as a single identification element (e.g., a PIN number) to return to the application. This allows the user to quickly re-access the application, whereas the initial access secure parts of the application after launch typically can require multifactor identification elements.

In another implementation, different tiers of authentication protocol may be implemented based on the length of the time delay in requesting re-access to the application. As an example, if the time delay in receiving the request to return to the application is greater than a first predetermined duration (e.g., 30 seconds) but less than a second predetermined duration (e.g., 20 minutes), then an easier, single identification element may be required to re-access the application. If the time delay is greater than the second predetermined duration (e.g., 20 minutes) but less than a third predetermined duration (e.g., 1 hour), then the user may be requested to provide at least two identification elements, such as a user name, a password, and/or a PIN number, to return to the previous screen of the application. After a fourth predetermined duration (e.g., 2 hours), the user is logged out, and the user's data on the previous screen is discarded.

In embodiments of the present invention, triggering of the authentication protocol includes communicating with a financial institution system by transmitting, via network, the identification element input (e.g., a PIN number) received from the user on the device screen. The identification element input received from the user can be compared with the user's credential data stored in a database of the financial institution system. The financial institution system determines whether the identification element input from the user matches the stored user credential data. If the identification element input is authenticated by the authentication engine, confirmation of user authentication is transmitted from the financial institution to the user's mobile computing device through network 130.

If the user is authenticated using an authentication protocol in accordance with the present invention (224), then the previous screen of the application is displayed on the device screen and the user can resume tasks on the previous screen (228). If the user is not authenticated, then a session ends and the screen of the application is reset to a default. A default screen may be an initial launch screen or a window indicating to the user that the logon process was unsuccessful (226).

While a PIN number, a user name, and a password can be used as user identification elements, other identification elements may be used in addition or in alternative to these elements. For example, biometric measurements, such as a user's finger print, retina scan, or voice identification, may be used as part of a user authentication protocol. The authentication procedures can also involve the use of digital certificates or a security key.

While not illustrated in FIG. 2, the method 200 may include determining whether a previous session of the application is still alive. The length of a session may be set for any suitable time duration (e.g., 2 hours). The session may be closed after the selected time period, and the screen may be reset to a default screen. In an implementation, this step may be incorporated prior to checking whether the previous screen was in a secured area of the application (214) or prior to determining whether authentication is required based on the user's action (218).

It should be appreciated that the specific steps illustrated in FIG. 2 provide a particular method of managing access to an application on a mobile computing device according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. For example, features described in other figures or parts of the application can be combined with the features described in FIG. 2. One of ordinary skill in the art would recognize many variations, modifications, and alternatives.

Figure 3:
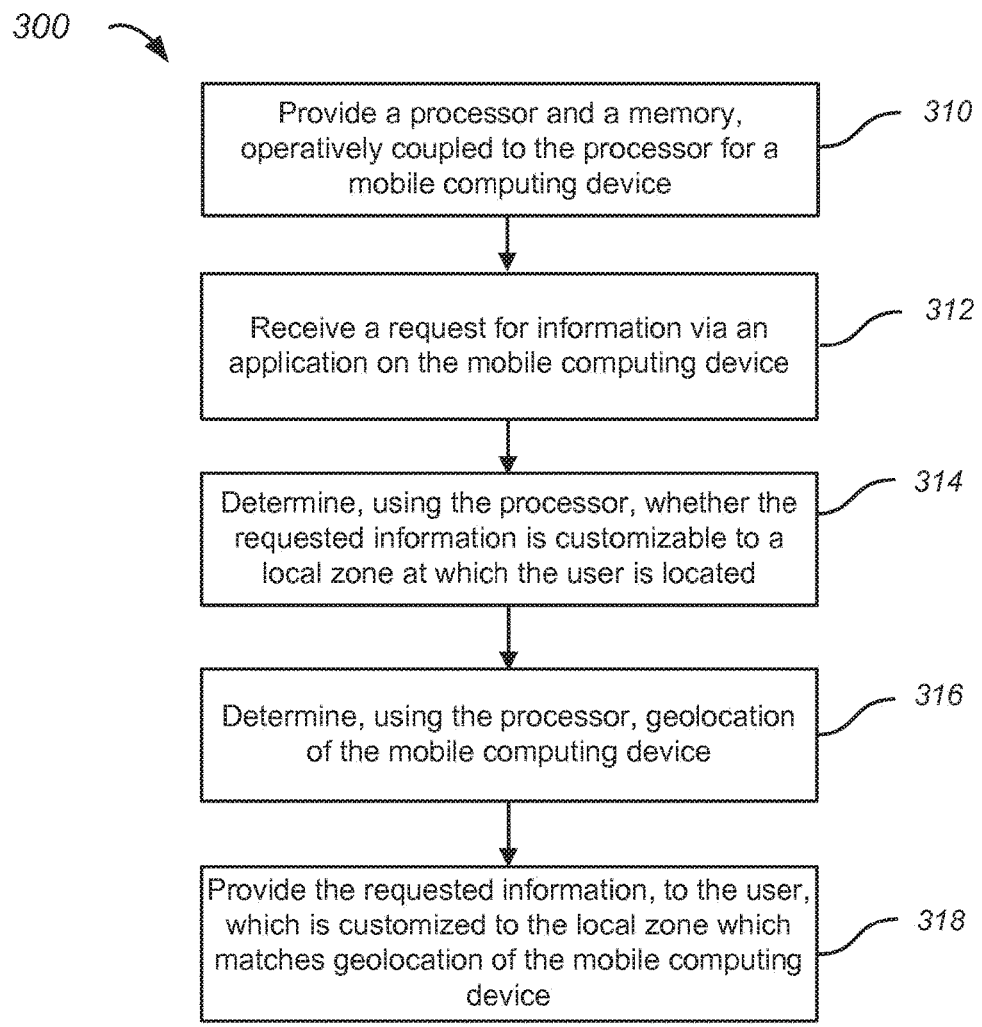
FIG. 3 is a high level flowchart illustrating a method of providing geolocation dependent information using a mobile computing device according to an embodiment of the present invention.

FIG. 3 is a high level flowchart illustrating a method of providing geolocation dependent information using a mobile computing device according to an embodiment of the present invention. In a method 300, a mobile computing device is provided with a processor and a memory, operatively coupled to the processor (310). An application for accessing financial services is downloaded to, or otherwise configured with, the mobile computing device. The method 300 also includes receiving from a user a request for information via the application on the mobile computing device (312). As an example, the requested information may be related to contact information for contacting the institution through the application via the mobile computing device to receive customer support. The method also includes determining, using the processor, whether the requested information is customizable to a local zone at which the user is located (314).

Examples of information customizable to a local zone may include a phone number for contacting the institution providing the mobile application. If the user is located in United. Kingdom, then a phone number for contacting the institution may be different from a domestic phone contact number within the U.S. territory. In addition, hours of operation for the institution located in the U.S. may be displayed in terms of hours of operation according to the local time. Furthermore, geolocation data of the user can be used to provide appropriate mailing addresses, nearby retail locations, nearby service providers, or the like.

If it is determined that the requested information is customizable to a local time zone, then the method includes determining, using the processor, the geolocation of the mobile computing device (316), which would indicate the geolocation of the user. After determining geolocation of the mobile computing device using a geolocator 159 (shown in FIG. 1), the requested information is customized to the local time zone which matches geolocation of the mobile computing device (316). For example, if the user and the user's mobile computing device are located in United Kingdom, then a special phone number with international requirements is displayed on the device screen with hours of operation according to the local time.

In an embodiment, geolocation data may also be used to optimize contact routing. For example, if a member's location is known at the time of the call or digital contact, the financial institution may use the information to route the member's contact to a representative with specific, local-area knowledge and experience. This can result in a better personal experience and more efficient interaction for the members of the financial institution.

In another embodiment, geolocation transit-status data may be used to optimize a contact experience. For example, if a member is identified as currently in transit (geolocation data reflects a certain rate of direction/velocity/altitude), the financial institution can use that information to adjust and limit on-screen interactions for the user, in favor of hands- and eyes-free interaction methods. This can result in a better and safer experience for members and reduce a risk of automobile accidents.

It should be appreciated that the specific steps illustrated in FIG. 3 provide a particular method of providing geolocation dependent information according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. For example, features described in other figures or parts of the application can be combined with the features described in FIG. 3. One of ordinary skill in the art would recognize many variations, modifications, and alternatives.

Figure 4A:
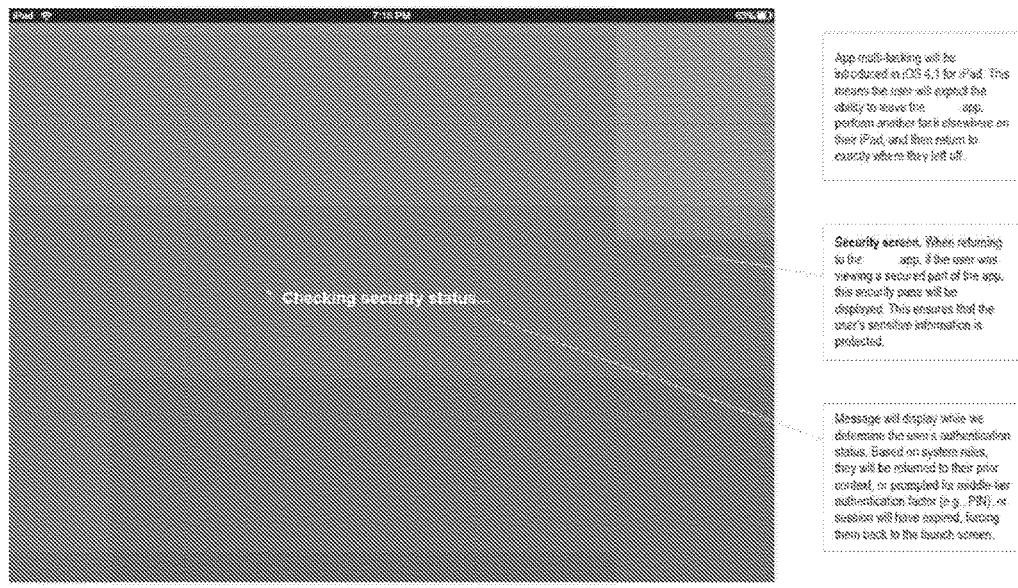
FIGS. 4A and 4B are high level schematic diagrams illustrating a graphical user interface for managing access to an application on a mobile computing device.

FIG. 4A is a high level schematic diagram illustrating a graphical user interface when a mobile computing device receives a request from a user to return to a screen in the application that was previously accessed on the mobile computing device. Since a mobile computing device is capable of multitasking, a user is expected to leave an application to perform another task elsewhere on the user's computing device and then return to exactly where the user left off. When the user attempts to return to the application by pressing a home button or an icon for the application, a security pane will appear if the user was viewing a secured part of the application. The security pane ensures that the user's sensitive information is protected.

As shown in FIG. 4A, the security pane may display a "checking security status" message. The message may be displayed while the user's authentication status is determined. Based on system rules, the user may be returned to the prior context, or may be prompted for a middle-tier authentication factor (e.g., PIN). Alternatively, the session may be expired (e.g., after 20 minutes), forcing the user back to the launch screen. In some embodiments, rather than showing the "checking security status" message, the session state can be validated quickly and the user can proceed straight to an appropriate authentication pane.

Figure 4B:
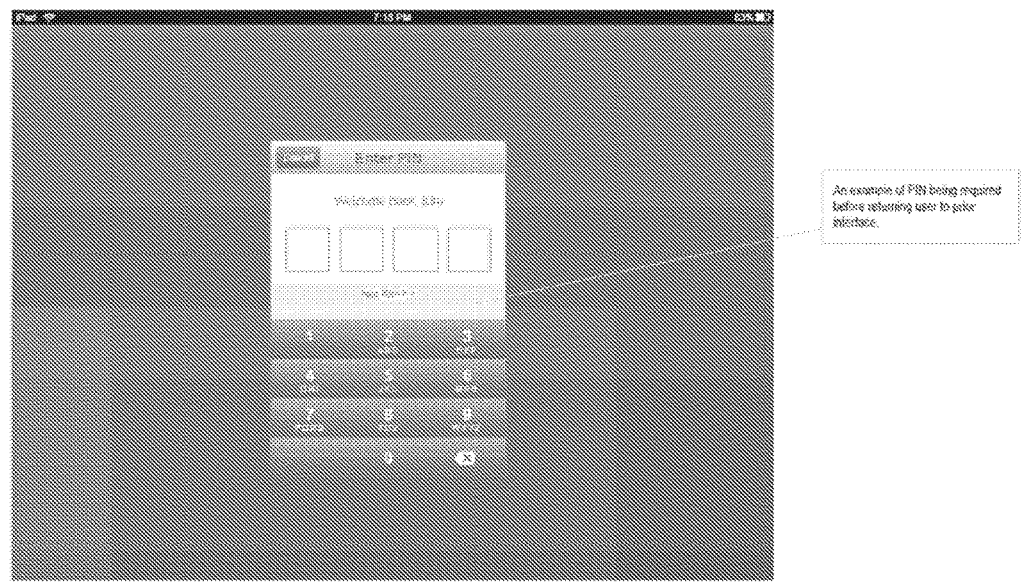

FIG. 4B is a high level schematic diagram illustrating a graphical user interface showing an example of a window requiring a PIN number before returning the user to the prior interface.

Figure 5A:
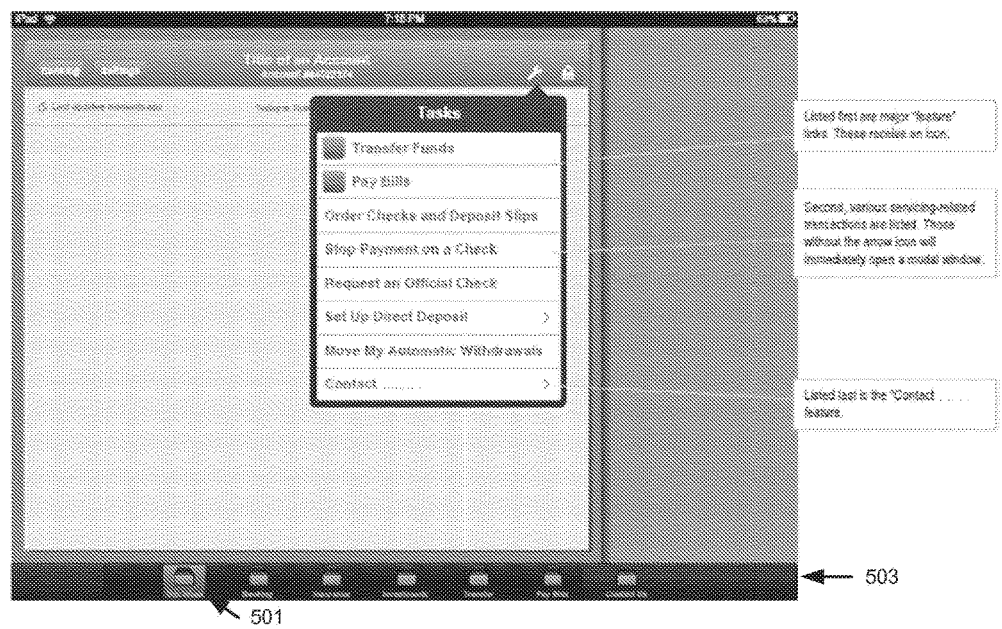
FIGS. 5A and 5B are schematic diagrams illustrating a graphical user interface for a tasks dropdown menu.
Figure 5B:
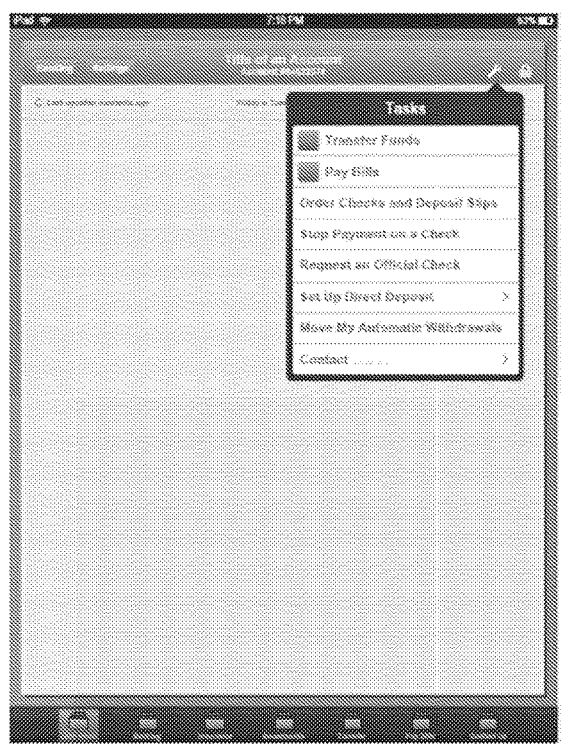

FIGS. 5A and 5B show high level schematic diagrams illustrating graphical user interfaces showing a tasks dropdown menu when the user selects a "This Week" tab 501 shown in a tab bar 503 at the bottom. FIG. 5B is a vertical orientation of the same window shown in FIG. 5A when a mobile computing device is oriented vertically. The major features such as "Transfer funds" or "Pay Bills" receive an icon. Various servicing-related transactions are listed. The transactions without an arrow icon will immediately open a modal window. Listed last in the modal window is the "Contact" feature.

Figure 7:
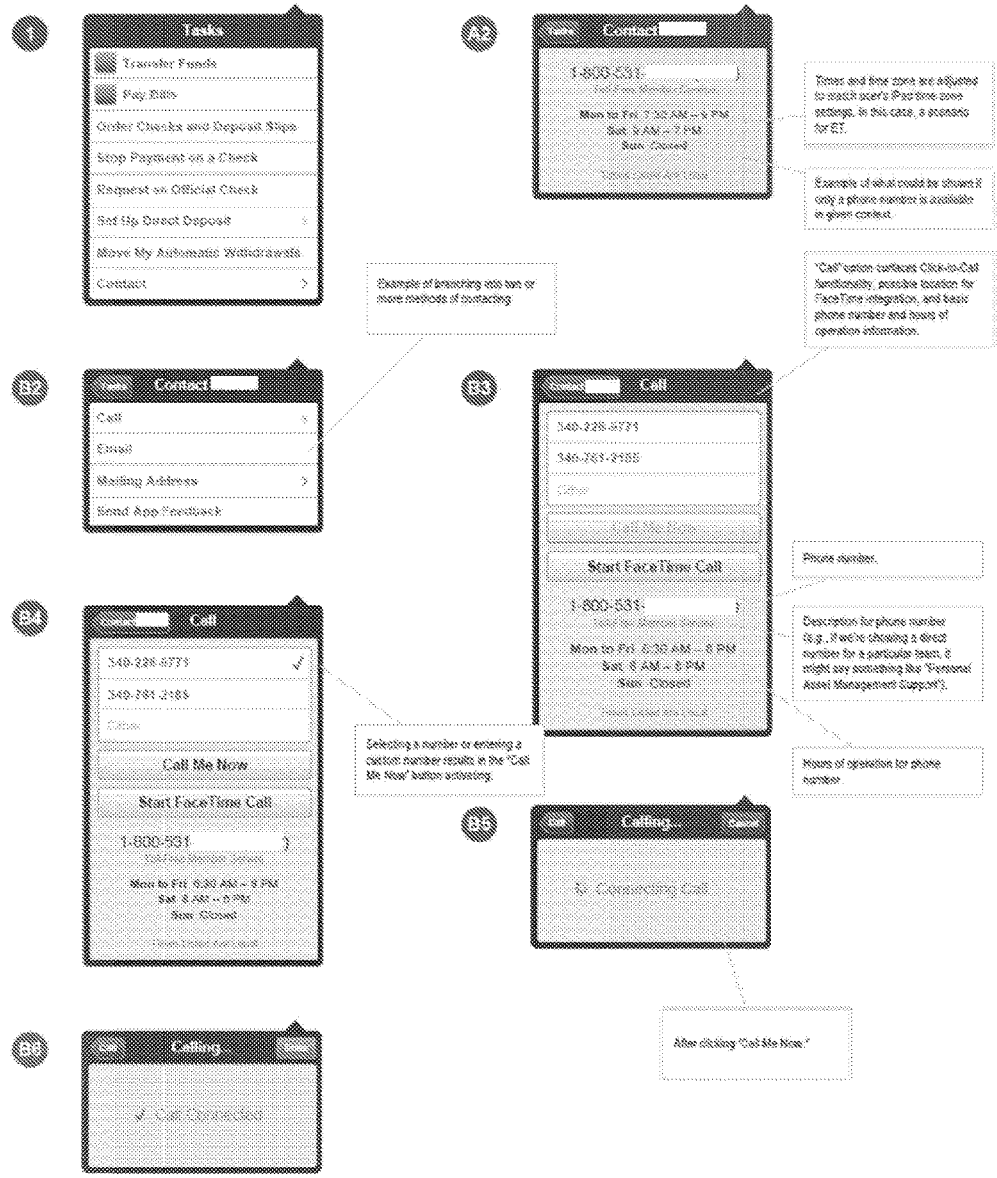
FIG. 7 is a high level schematic diagram illustrating a graphical user interface for providing geolocation dependent information using a mobile computing device.

FIG. 7 shows high level schematic diagrams illustrating a number of different dropdown lists. A dropdown menu 1 is shown when a task icon (represented by a wrench) selected by a user. When the user wishes to contact an institution providing the application, the user can select "Contact" from the task list. As shown in A2 of FIG. 7, the contact number for the financial institution is listed for the user. The displayed times and time zone are adjusted to match the user's iPad™ zone settings. In the example shown in FIG. 7 A2, a scenario is for the Eastern Time Zone. As shown in B3, the member's phone numbers (e.g., home, mobile, or work) are displayed, as per profile data on file. The financial institution's contact number is also displayed. Underneath the 800 phone number, the description for the phone number may be displayed. For example, "Personal Asset Management Support" may be displayed underneath the 800 phone number. As shown in B5 of FIG. 7, the user may select the user's number or entering a custom number results in activation of the "Call Me Now" button. After clicking "Call Me Now" button, a call may be connected.

Figure 8:
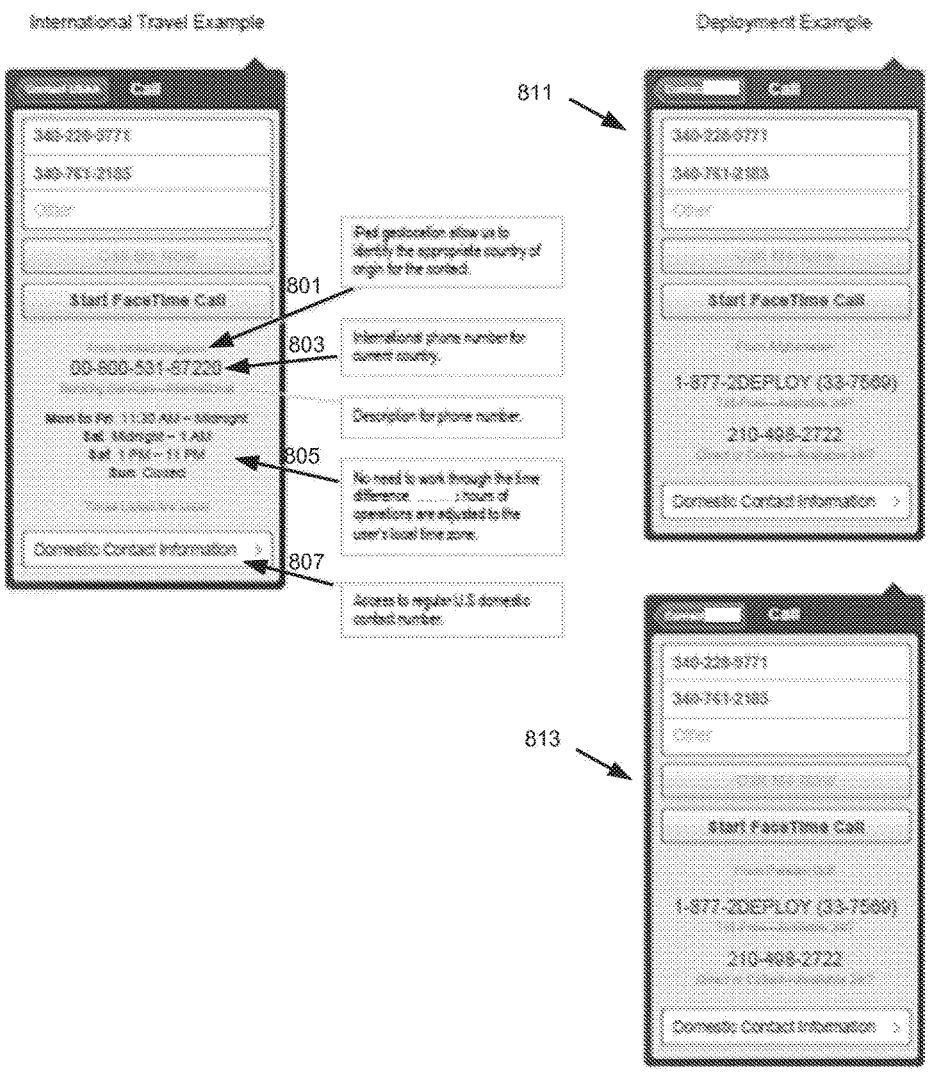
FIG. 8 is a high level schematic diagram illustrating a graphical user interface for providing geolocation dependent information using a mobile computing device.

FIG. 8 shows high level schematic diagrams illustrating a number of different dropdown menus when the user selects "call" from the Contact window. The geolocator in the mobile computing device determines the appropriate country of origin for the contact. In the exemplary dropdown menu 801 shown in FIG. 8, the geolocator of the user's mobile computing device determines that appropriate country of origin for the contact (i.e., United Kingdom). After determination, an international phone number for the current country is displayed for the user 803. As shown in FIG. 8, the user need not work through the time difference as shown in 805. The hours of operations for the financial institution are adjusted to the local time zone (i.e., U.K., in the example shown in FIG. 8). Regular U.S. domestic contact number can be also accessed through the Call window as shown in 807.

FIG. 8 on the right hand side shows high level schematic diagrams illustrating dropdown menus 811 and 813 for deployed military members. Upon determining that the user is deployed (e.g., via a notification from a member), the geolocator of the user's mobile computing device may automatically determine the user's location and provide a special phone number and other contact information for the deployed members.

Figure 9:
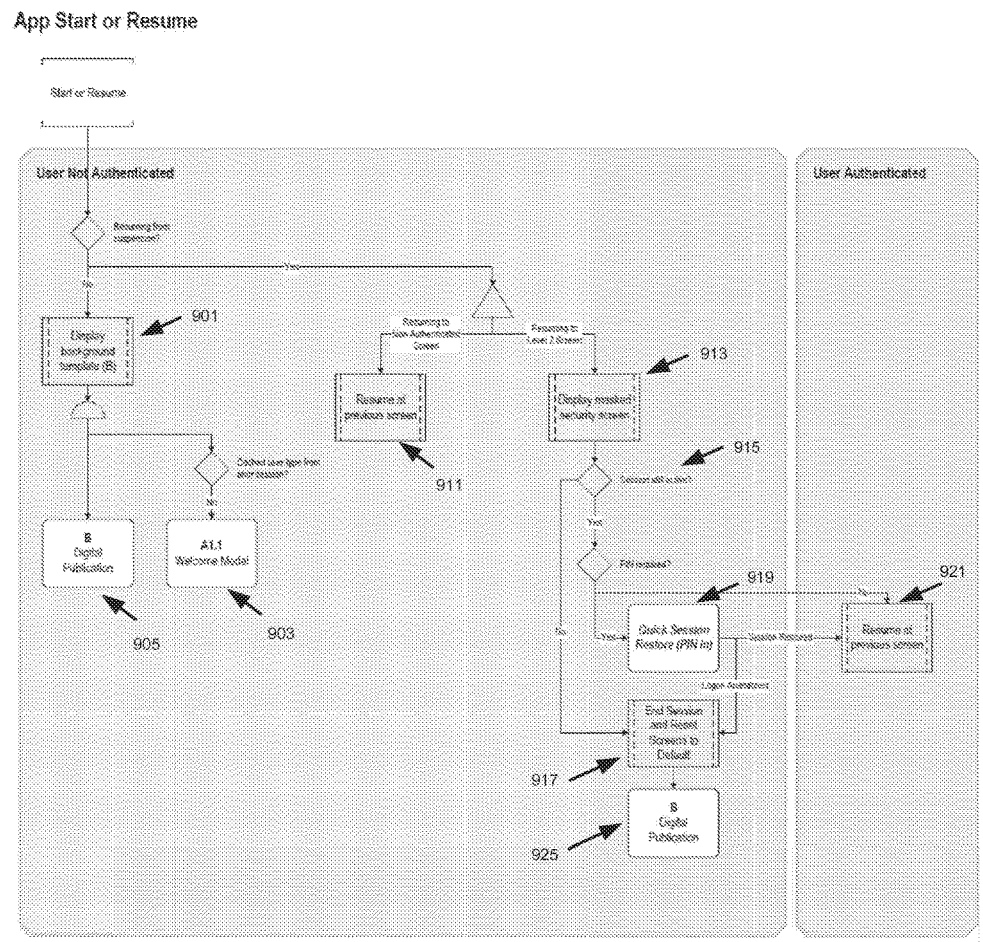
FIG. 9 is a high level schematic diagram illustrating a flow chart for starting or resuming an application.

FIG. 9 shows a high level schematic diagram illustrating a flow chart for starting or resuming an application. When an unauthenticated user is not resuming from suspension, then a background template 901 is displayed on a user interface of the user's mobile computing device. When the user profile or type has not been cached during the prior session, a welcome modal 903 is displayed on the mobile computing device. When the user profile or type has been cached during the prior session, then a digital publication 905 prepared for the appropriate user profile is provided on the user interface.

If the user is resuming from suspension, then it is determined whether the user is resuming to a non-authenticated screen or to a level 2 screen. In an embodiment of the present invention, a level 2 screen is a screen that requires full authentication to view. Level 1 may be achieved when a user enters his user name and password. Then, after entering an additional factor, for example, a PIN and/or answer to a security question, level 2 is achieved, providing fully authenticated access to private account information and transaction options. If the user is resuming to a non-authenticated screen that does not have any sensitive information, then the user can return to the previous screen 911. When the user is resuming to the level 2 screen, then a masked security screen 913 is displayed on the screen of the mobile computing device to protect any sensitive information. It is then determined whether the session is still active (915). For example, if the application was hibernating in the background for more than 20 minutes, then the application ends the session and resets screens to default (917).

If the session is still alive, then it is determined whether PIN or other user identification information is required (919). If the PIN or other user identification information is not required, then the application resumes at the previous screen (921). If the PIN is required, then a quick PIN in session (923) is provided. If the quick PIN in session has been successfully completed, then the session is restored and the application resumes at the previous screen (921). If the login procedure has been abandoned, then the application ends the session and resets screens to default (917) and a digital publication 925 is provided.

Figure 10:
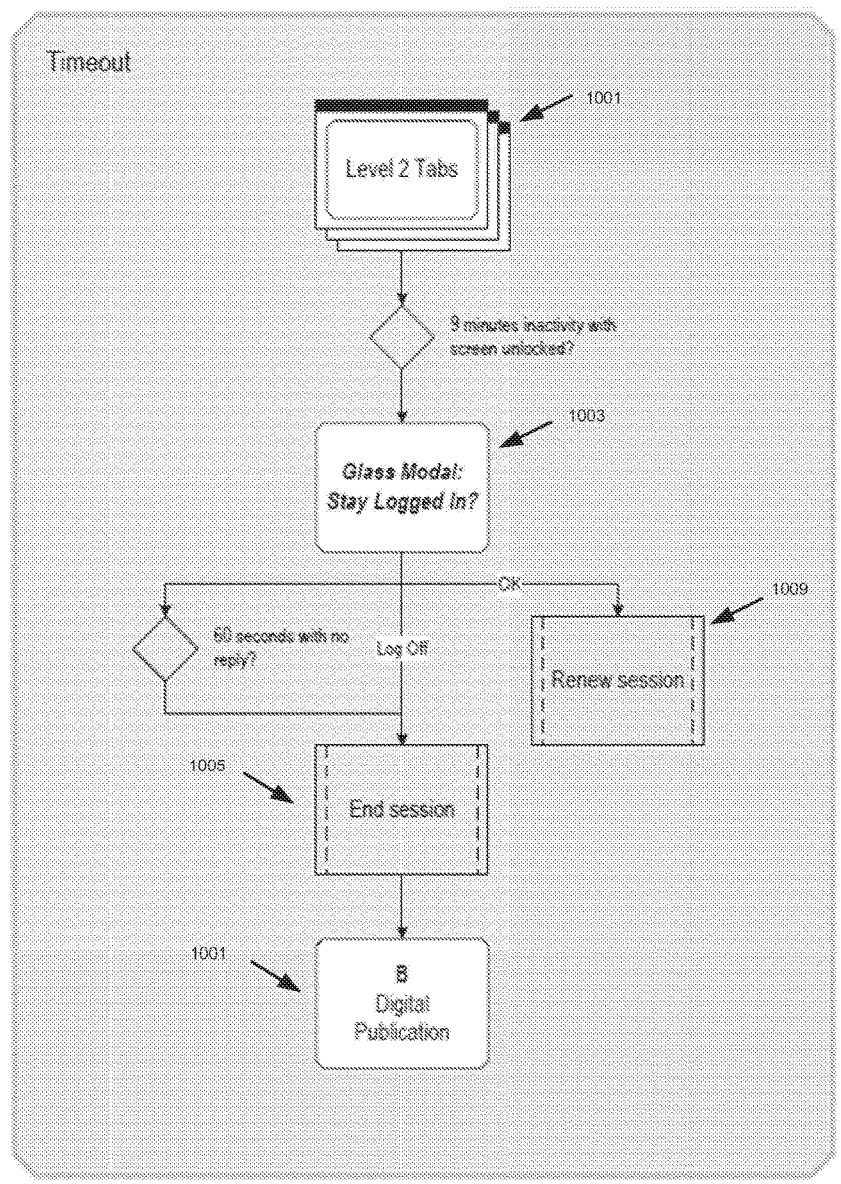
FIG. 10 is a high level schematic diagram illustrating a flow chart for timing out an application.

FIG. 10 shows a high level schematic diagram illustrating when an application is timed out from level 2 tabs. In the embodiment shown in FIG. 10, when there is 9 minutes of inactivity with the screen unlocked, then a glass modal 1003, querying the user "Stay Logged In?" is displayed on the mobile computing device. If a preselected time period (e.g., 60 seconds) has passed with no reply, the application ends the session (1005) and the user is logged off. Then a digital publication 1007 can be provided. If the user's reply is received at step 1003, then the session is renewed (1009).

Figure 11:
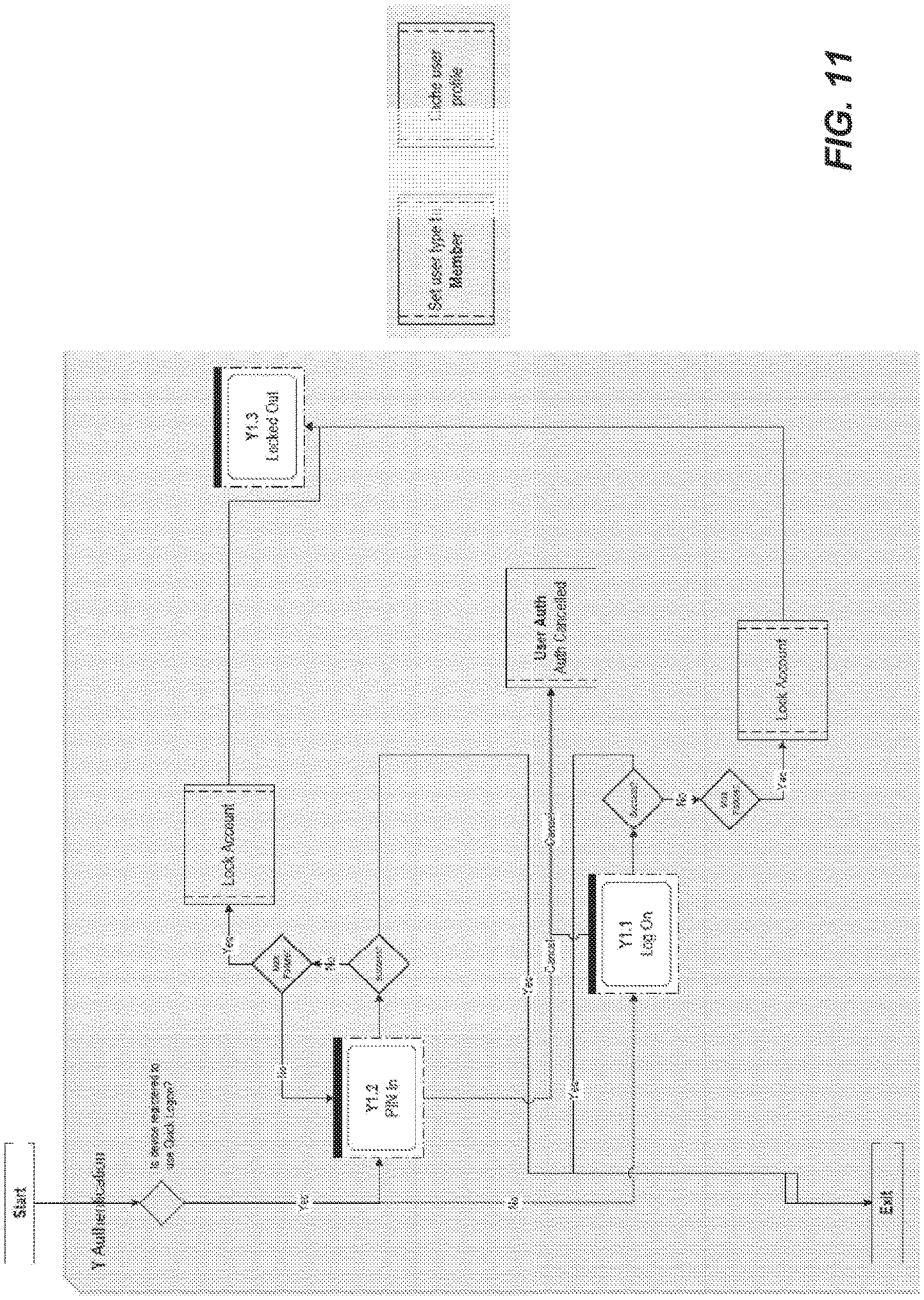
FIG. 11 is a high level schematic diagram illustrating a flow chart illustrating a user authentication process.

FIG. 11 shows a high level schematic diagram illustrating user authentication procedure and when to lock out the account. If the user device is registered to user Quick Logon, the flow chart shown in FIG. 11 is used to determine whether to lock out the user's account. During the authentication procedure, the user's profile can be set and cached.

Figure 12:
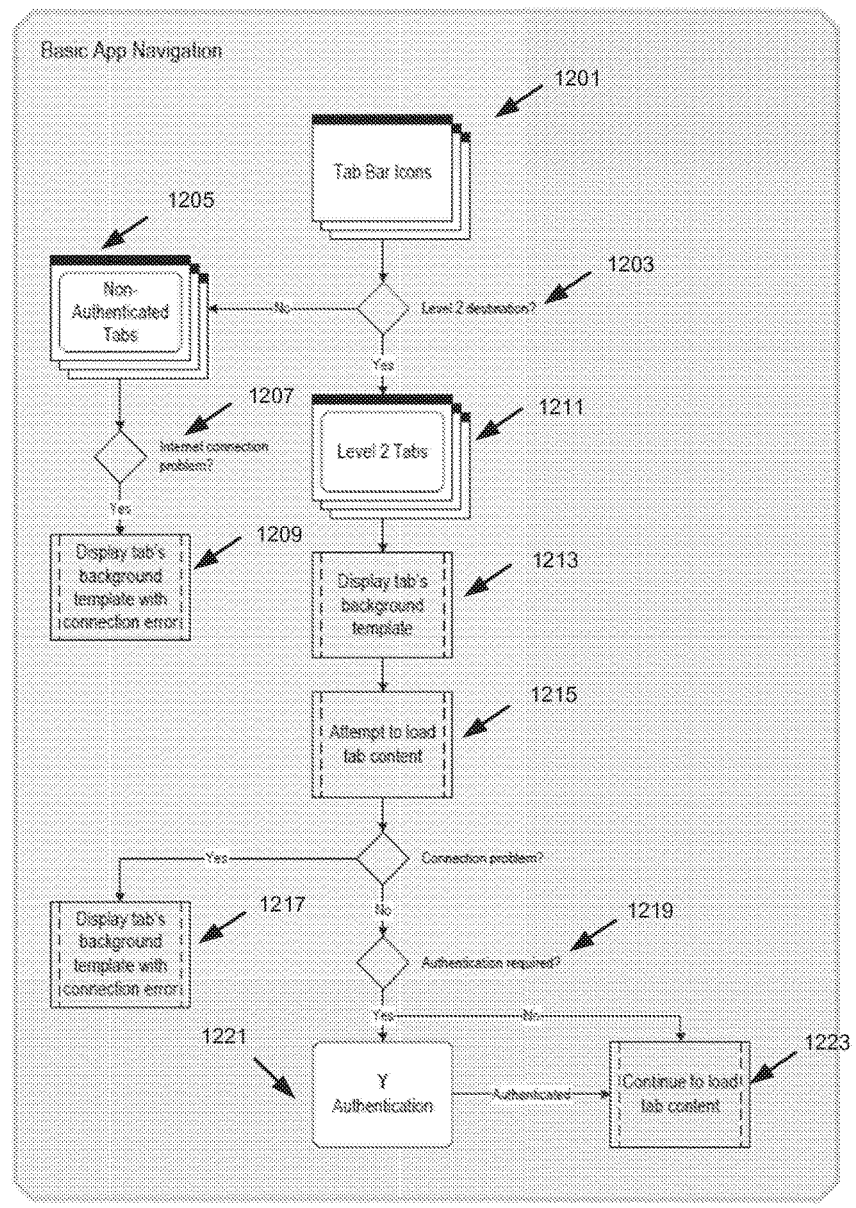
FIG. 12 is a high level schematic diagram illustrating a flow chart illustrating an overview of basic application navigation.

FIG. 12 shows a high level schematic diagram illustrating an overview of basic application navigation. Once tab bar icons 1201 (e.g., banking, insurance, investments, pay bills, transfer deposit, or like) are selected by a user, it is determined whether the tabs are associated with level 2 destinations (1203). If the selected tab bar icons are non-authenticated tabs (1205), it is determined whether there is an Internet connection problem (1207). The non-authenticated tabs are tabs profiled for prospects or tabs that do not lead to sensitive data. If there is an Internet connection problem, then the selected tab's background template is displayed with a message indicating a connection error (1209).

In step 1203, if it is determined that the selected tab is a level 2 tab 1211, then the tab's background template 1213 is displayed, and the application attempts to load the tab content 1215. If there is an Internet connection problem, then the tab's background template with a connection error message 1217 is displayed. If there is no Internet connection problem, then it is determined whether authentication is required to display the content associated with the selected tab in step 1219. If the authentication is required in step 1219, then the authentication procedure 1221 such as the flow chart shown in FIG. 11 is provided for the user. If user authentication is not required, then the tab content is loaded and displayed on the mobile computing device (1223).

Figure 13:
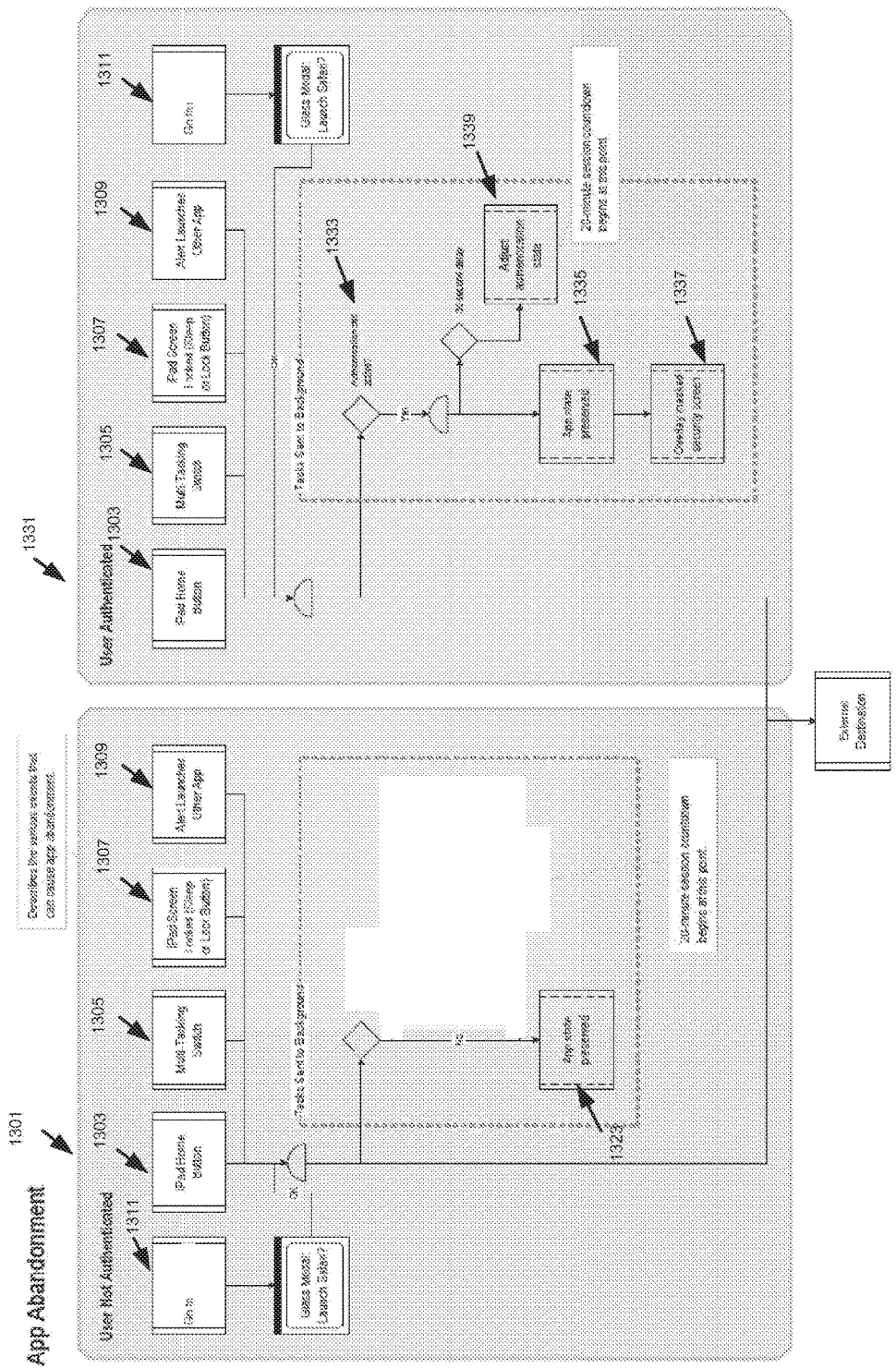
FIG. 13 is a high level schematic diagram illustrating a flow chart illustrating an application abandonment and sending tasks to background.

FIG. 13 shows a high level schematic diagram illustrating a flowchart when the application becomes abandoned. A number of different events can cause abandonment of the application. For example, pushing the iPad home button (1303), multi-tasking switch (1305), iPad screen being locked (sleep or lock button) (1307), or alert launching other applications (1309) can send the application to the background of the user device. Also, selecting of an option by the user to visit a website for the financial institution (1311) can also send the application to the background of the user device.

The schematic diagram 1301 on the left side of FIG. 13 illustrates a flowchart when the user is not authenticated. When the application is sent to the background of the user device, then the application state is preserved (1323).

The schematic diagram 1331 on the right side of FIG. 13 illustrates a flow chart when the user is authenticated. When the application is sent to the background of the user device, it is determined whether the authentication is still active (1333). If it is alive, the application state is preserved (1335) and a security screen is overlaid to mask the view (1337). If there was more than a 30 second delay for the user to return to the application, then the authentication state of the application is adjusted to protect member accounts and data when the user returns (1339). In one embodiment, when an abandonment of the application is detected, the authentication state is adjusted by setting up screen masking and providing a secondary authentication measure (e.g., requesting a PIN) when the user returns within a predetermined time period.

Figure 14A:
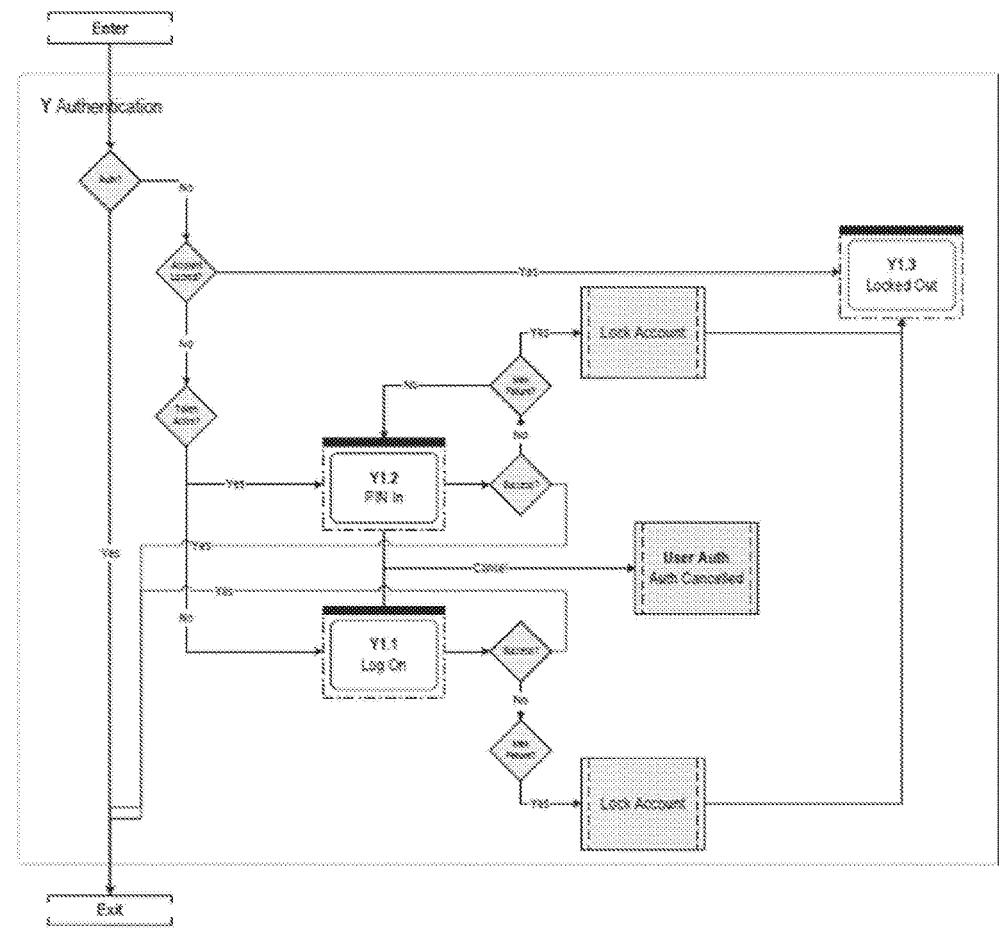
FIG. 14A is a high level schematic diagram illustrating a flow chart illustrating a user authentication process and which screens to display to the user.

FIG. 14A shows a high level schematic diagram illustrating user authentication process and which screens to display to the user.

Figure 14B:
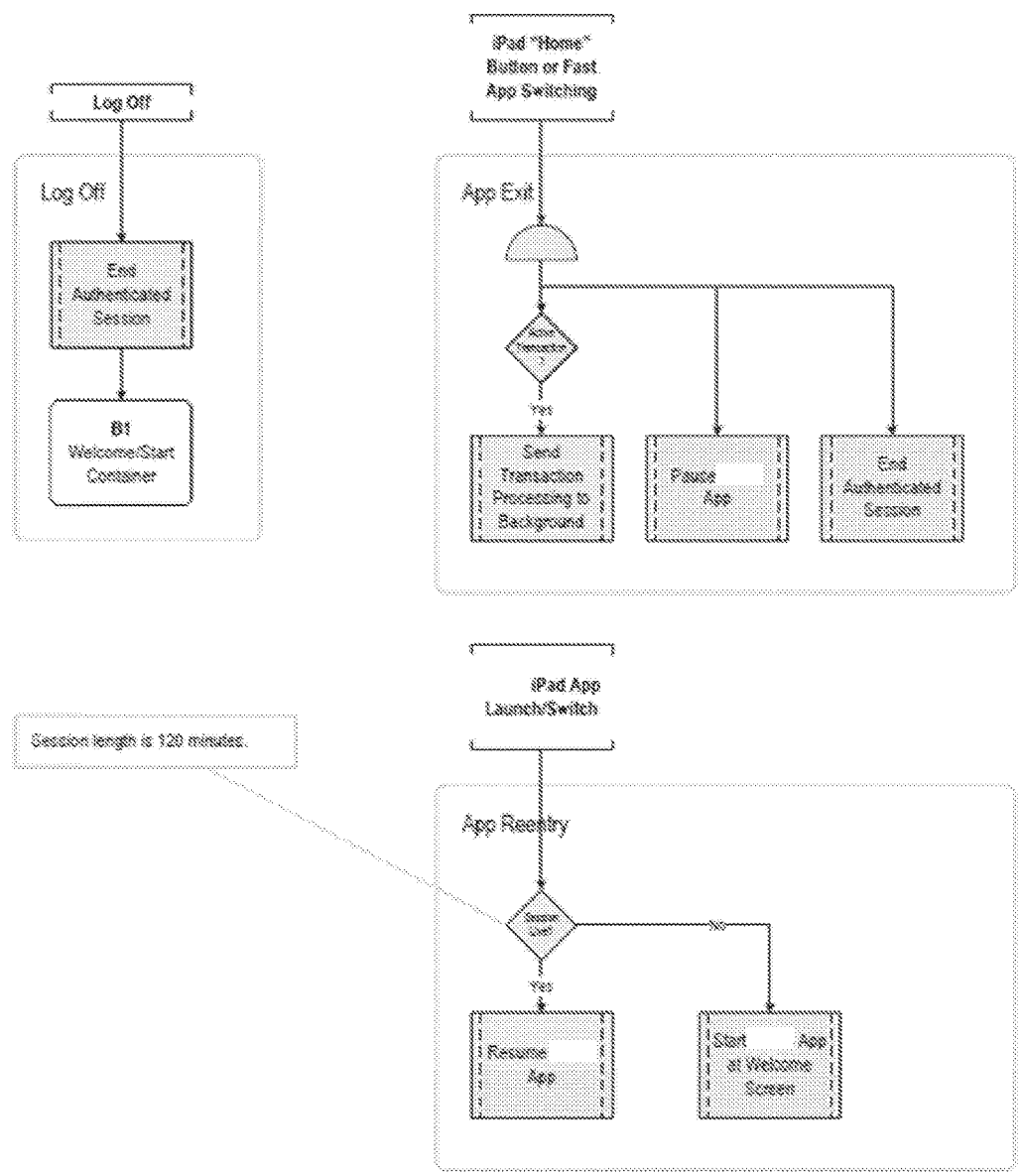
FIG. 14B are high level schematic diagrams illustrating flow charts of application log off, application exit, and application reentry.

FIG. 14B shows high level schematic diagrams showing flowcharts for logging off, application exit, and application reentry.

FIG. 6 is a high level block diagram illustrating a computer system including instructions to perform any one or more of the methodologies described herein. A system 600 includes a computer 610 connected to a network 130. The computer 610 includes a processor 620 (also referred to as a data processor), a storage device 622, an output device 624, an input device 626, and a network interface device 628, all connected via a bus 630. The processor 620 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 620 executes instructions and includes that portion of the computer 610 that controls the operation of the entire computer. Although not depicted in FIG. 6, the processor 620 typically includes a control unit that organizes data and program storage in memory and transfers data and other information between the various parts of the computer 610. The processor 620 receives input data from the input device 626 and the network 130 reads and stores code and data in the storage device 622 and presents data to the output device 624.

Although the computer 610 is shown to contain only a single processor 620 and a single bus 630, the disclosed embodiment applies equally to computers that may have multiple processors and to computers that may have multiple busses with some or all performing different functions in different ways.

The storage device 622 represents one or more mechanisms for storing data. For example, the storage device 622 may include read-only memory (ROM), random access memory (RAM), magnetic disk storage media, optical storage media, flash memory devices, and/or other machine-readable media. In other embodiments, any appropriate type of storage device may be used. Although only one storage device 622 is shown, multiple storage devices and multiple types of storage devices may be present. Further, although the computer 610 is drawn to contain the storage device 622, it may be distributed across other computers, for example on a server.

The storage device 622 includes a controller (not shown in FIG. 6) and data items 634. The controller includes instructions capable of being executed on the processor 620 to carry out the methods described more fully throughout the present specification. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the storage device 622 may also contain additional software and data (not shown), which is not necessary to understand the invention.

Although the controller and the data items 634 are shown to be within the storage device 622 in the computer 610, some or all of them may be distributed across other systems, for example on a server and accessed via the network 130.

The output device 624 is that part of the computer 610 that displays output to the user. The output device 624 may be a liquid crystal display (LCD) well-known in the art of computer hardware. But, in other embodiments the output device 624 may be replaced with a gas or plasma-based flat-panel display or a traditional cathode-ray tube (CRT) display. In still other embodiments, any appropriate display device may be used. Although only one output device 624 is shown, in other embodiments any number of output devices of different types, or of the same type, may be present. In an embodiment, the output device 624 displays a user interface.

The input device 626 may be a keyboard, mouse or other pointing device, trackball, touchpad, touch screen, keypad, microphone, voice recognition device, or any other appropriate mechanism for the user to input data to the computer 610 and manipulate the user interface previously discussed. Although only one input device 626 is shown, in another embodiment an number and type of input devices may be present.

The network interface device 628 provides connectivity from the computer 610 to the network 130 through any suitable communications protocol. The network interface device 628 sends and receives data items from the network 130.

The bus 630 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 610 may be implemented using any suitable hardware and/or software, such as a personal computer or other electronic computing device. Portable computers, laptop or notebook computers, PDAs (Personal Digital Assistants), mobile phones, pocket computers, tablets, appliances, telephones, and mainframe computers are examples of other possible configurations of the computer 610. For example, other peripheral devices such as audio adapters or chip programming devices, such as EPROM (Erasable Programmable Read-Only Memory) programming devices may be used in addition to, or in place of, the hardware already depicted.

The network 130 may be any suitable network and may support any appropriate protocol suitable for communication to the computer 610. In an embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be any appropriate cellular data network or cell-based radio network technology. In another embodiment, the network 130 may be an IEEE 802.11 wireless network. In still another embodiment, the network 130 may be any suitable network or combination of networks. Although one network 130 is shown, in other embodiments any number of networks (of the same or different types) may be present.

A user mobile computing device 150 can interact with computer 610 through network 130. The user mobile computing device 150 includes a processor 152, a storage device 154, and an input/output device 156. The description related to processor 620 and storage device 622 is applicable to processor 152 and storage device 154. As an example, the user mobile computing device 150 can be a table computer, laptop computer, a smartphone, or the like, operated by a member of a membership organization (e.g., the present assignee). Using the user mobile computing device 150, the member can then interact with computer 610 operated by the present assignee through network 130 in order to access the present assignee's web pages or the like.

The embodiments described herein may be implemented in an operating environment comprising software installed on any programmable device, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method performed by at least one processor of a mobile computing device for managing access to an application executed by the mobile computing device, the method comprising:

receiving, by the at least one processor of the mobile computing device, a request from a user to return to the application and resume at least one task using a previous screen of the application on the mobile computing device, wherein the at least one task is associated with a time delay from a time point of an application abandonment to a time point of receiving the request;

determining whether the mobile computing device has changed in one or more of a position and an orientation from a time point of abandonment of the application and a time point of receiving the request; and in response to the time delay exceeding a predetermined time duration and the mobile computing device having changed one or more of the position and the orientation above respective thresholds:

determining, by the at least one processor of the mobile computing device, that the previous screen of the application is in a secured area of the application, and that, based on at least one task performed by the user in the secured area of the application, authentication of the user is required to return to the previous screen of the application;

initiating, by the at least one processor of the mobile computing device, a middle tier authentication protocol based on the at least one task, the middle tier authentication protocol being less rigorous than an initial authentication protocol executed by the application to initially authenticate the user to the application, and in response to authentication of the user based on the middle tier authentication protocol, displaying the previous screen within the application.

2. The method of claim 1, wherein whether the previous screen is in the secured area of the application is determined based on a user profile of the user.

3. The method of claim 1, wherein the middle tier authentication protocol comprises:
   providing a login screen for the user to provide at least one identification element;
   transmitting the at least one identification element to a system of an enterprise providing the application, the system storing the identification element; and
   receiving, from the system, an indication that the user is authentic based on the at least one identification element.

4. The method of claim 1, further comprising:
   receiving an indication of abandonment of the application by the user without closing the application; and
   profiling the previous screen as being in the secured area or in an unsecured area locally in the application.

5. The method of claim 1, further comprising:
   determining whether the mobile computing device has changed in one or more of a position and an orientation from a time point of abandonment of the application and a time point of receiving the request; and
   triggering the middle tier authentication protocol when the mobile computing device has changed one or more of the position and the orientation above respective thresholds.

6. A system, comprising:
   at least one processor; and
   a computer-readable medium coupled to the at least one processor and storing a plurality of instructions, which, when executed by the at least one processor, cause the at least one processor to perform operations for managing access to an application on a mobile computing device, the operations comprising:
   receiving a request from a user to return to the application and resume at least one task using a previous screen of the application on the mobile computing device, wherein the at least one task is associated with a time delay from a time point of an application abandonment to a time point of receiving the request;
   determining whether the mobile computing device has changed in one or more of a position and an orientation from a time point of abandonment of the application and a time point of receiving the request; and
   in response to the time delay exceeding a predetermined time duration and the mobile computing device having changed one or more of the position and the orientation above respective thresholds:
   determining that the previous screen of the application is in a secured area of the application, and that, based on at least one task performed by the user in the secured area of the application, authentication of the user is required to return to the previous screen of the application;
   initiating a middle tier authentication protocol based on the at least one task, the middle tier authentication protocol being less rigorous than an initial authentication protocol executed by the application to initially authenticate the user to the application, and in response to authentication of the user based on the middle tier authentication protocol, displaying the previous screen within the application.

7. The system of claim 6, wherein the at least one task is associated with a time delay from a time point of an application abandonment to a time point of receiving the request, the middle tier authentication protocol being executed in response to the time delay exceeding a predetermined time duration.

8. The system of claim 6, wherein whether the previous screen is in the secured area of the application is determined based on a user profile of the user.

9. The system of claim 6, wherein the middle tier authentication protocol comprises:
   providing a login screen for the user to provide at least one identification element;
   transmitting the at least one identification element to a system of an enterprise providing the application, the system storing the identification element; and
   receiving, from the system, an indication that the user is authentic based on the at least one identification element.

10. The system of claim 6, wherein operations further comprise:
   receiving an indication of abandonment of the application by the user without closing the application; and
   profiling the previous screen as being in the secured area or in an unsecured area locally in the application.

\* \* \* \* \*

UNITED STATES PATENT AND TRADEMARK OFFICE
CERTIFICATE OF CORRECTION

PATENT NO. : 9,906,957 B1  
APPLICATION NO. : 15/429469  
DATED : February 27, 2018  
INVENTOR(S) : Jeremy Fisher et al.

Page 1 of 1

It is certified that error appears in the above-identified patent and that said Letters Patent is hereby corrected as shown below:

On the Title Page

Item (72) Inventors: Line 3, delete "Chrisopher" and insert -- Christopher -- therefore.

Signed and Sealed this
Nineteenth Day of May, 2020

Andrei Iancu
*Director of the United States Patent and Trademark Office*